(12) United States Patent
Okano et al.

(10) Patent No.: US 6,623,879 B2
(45) Date of Patent: Sep. 23, 2003

(54) SOFT-MAGNETIC HEXAGONAL FERRITE COMPOSITE PARTICLES, AND GREEN SHEET USING THE SAME AND SOFT-MAGNETIC HEXAGONAL FERRITE SINTERED CERAMICS

(75) Inventors: Yoji Okano, Hiroshima (JP); Takayuki Yoshida, Ube (JP); Norio Sugita, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 10/116,110

(22) Filed: Apr. 5, 2002

(65) Prior Publication Data

US 2003/0148147 A1 Aug. 7, 2003

(30) Foreign Application Priority Data

Apr. 9, 2001 (JP) ........................................ 2001-109790
Feb. 13, 2002 (JP) ........................................ 2002-035226

(51) Int. Cl.⁷ .................... B32B 15/00; B32B 19/00; C01G 49/08; C04B 35/26
(52) U.S. Cl. .................... 428/701; 428/357; 428/402; 428/900; 428/702; 252/62.56; 252/62.59; 252/62.62; 252/62.63; 252/62.64
(58) Field of Search .................... 428/357, 900, 428/402, 692, 323, 328, 331, 701, 702; 252/62.56, 62.59, 62.62, 62.63, 62.64

(56) References Cited

U.S. PATENT DOCUMENTS

| 5,607,615 A | * | 3/1997 | Taguchi et al. ........... 252/62.63 |
| 5,954,992 A | | 9/1999 | Onizuka et al. |
| 6,033,593 A | | 3/2000 | Onizuka et al. |
| 6,379,579 B1 | * | 4/2002 | Harada ..................... 252/62.6 |

OTHER PUBLICATIONS

Kwon et al J. Applied Physics Amer. Inst. Physics vol. 75, No. 10, part 2A, May 1994 pp. 6109–6111 XXP000457046 The Microwave Absorbing and Resonance Phenomena of Y–type Hexagonalferrite Microwave Absorbers.

* cited by examiner

Primary Examiner—Deborah Jones
Assistant Examiner—G. A. Blackwell-Rudasill
(74) Attorney, Agent, or Firm—Nixon & Vanderhye P.C.

(57) ABSTRACT

Soft-magnetic hexagonal ferrite composite particles composed of 100 parts by weight of soft-magnetic hexagonal ferrite particles containing a Z-type ferrite, Y-type ferrite or W-type ferrite as a main phase, 0.3 to 10 parts by weight of barium carbonate particles, strontium carbonate particles or their mixture and 0.1 to 5 parts by weight of silicon dioxide particles.

36 Claims, 3 Drawing Sheets

SOFT-MAGNETIC HEXAGONAL FERRITE COMPOSITE PARTICLES, AND GREEN SHEET USING THE SAME AND SOFT-MAGNETIC HEXAGONAL FERRITE SINTERED CERAMICS

BACKGROUND OF THE INVENTION

The present invention relates to soft-magnetic hexagonal ferrite composite particles, and a green sheet using the same and a soft-magnetic hexagonal ferrite sintered ceramics. More particularly, the present invention relates to soft-magnetic hexagonal ferrite composite particles comprising soft-magnetic hexagonal ferrite particles, and barium carbonate particles and/or strontium carbonate particles; a green sheet using the soft-magnetic hexagonal ferrite composite particles; and a soft-magnetic hexagonal ferrite sintered ceramics using the soft-magnetic hexagonal ferrite composite particles which is produced by forming the soft-magnetic hexagonal ferrite composite particles into a compact and then sintering the compact, and which exhibits a high sintering density and a high volume resistivity as well as such frequency characteristics that an imaginary part of permeability thereof is not more than 1 at 400 MHz and becomes large at a frequency near several GHz, while a real part of permeability is kept substantially constant without lowering the real part in a frequency range of from low frequency to several hundreds MHz.

As well known in the arts, soft-magnetic cubic spinel ferrite sintered ceramics show a high imaginary part of permeability in a frequency range of several hundreds MHz, and, therefore, have been used as impedance elements for attenuating noises over a frequency range of several hundreds MHz due to magnetic loss thereof caused in such a frequency range, or electromagnetic wave absorbers for absorbing electromagnetic waves.

In addition, the soft-magnetic cubic spinel ferrite sintered ceramics show a constant real part of permeability over a frequency range of from low frequency to several tens MHz and, therefore, have also been widely used as inductor elements owing to a high inductance thereof.

With the recent development and progress of mobile communication systems such as portable telephones and PHS as well as high-speed digital devices for indoor use such as wireless LAN, personal computers and game devices, it has been rapidly attempted to apply signals having a frequency range of several hundreds MHz to these devices. However, the use of such signal frequencies in these devices has caused a significant problem that noises are produced near several GHz as harmonic thereof. Therefore, it has been strongly required to provide impedance elements and electromagnetic waver absorbers capable of attenuating and absorbing noises and electromagnetic waves having a higher frequency range near several GHz without any adverse influence on signals or electromagnetic waves having a frequency range of several hundreds MHz. In order to meet these requirements, it is necessary to not only reduce an imaginary part of permeability in a frequency range of several hundreds MHz, but also increase the imaginary part of permeability in a frequency range near several GHz.

Further, in order to use frequencies of several hundreds MHz as signals, it is required to provide an inductor element capable of exhibiting a constant high inductance in a frequency range of from low frequency to several hundreds MHz. To meet this requirement, it is also required that the real part of permeability of the inductor element is kept substantially constant without lowering in a frequency range of from low frequency to several hundreds MHz.

However, it is known that the soft-magnetic cubic spinel ferrite sintered ceramics have a so-called Snoek's limit, so that it is not possible to reduce the imaginary part of permeability thereof in a frequency range of several hundreds MHz. Therefore, when the conventional soft-magnetic cubic spinel ferrite sintered ceramics are used as impedance elements or electromagnetic wave absorbers in electronic devices using signals having a frequency range of several hundreds MHz, there arises such a problem that the signal frequencies of several hundreds MHz required for operating the electronic devices are disadvantageously attenuated or absorbed because of magnetic loss thereof.

Also, the real part of permeability of the conventional sintered ceramics is reduced in a frequency range beyond several hundreds MHz according to the Snoek's limit. As a result, there is caused such a problem that inductor elements using the conventional soft-magnetic cubic spinel ferrite sintered ceramics tend to be inapplicable to the electronic devices using signals having a frequency range of several hundreds MHz.

On the other hand, there have been proposed soft-magnetic hexagonal ferrite sintered ceramics having a crystal structure of Z-type ferrite, Y-type ferrite or W-type ferrite which can exhibit a small imaginary part of permeability in a frequency range of several hundreds MHz and a large imaginary part of permeability in a frequency range near several GHz exceeding the Snoek's limit. Specifically, when the soft-magnetic hexagonal ferrite sintered ceramics are used as impedance elements or electromagnetic wave absorbers, it is possible to use signals having a frequency range of several hundreds MHz, and it is also expected to attenuate and absorb noises near several GHz which are produced as harmonic of these signal frequencies.

Further, there have been proposed soft-magnetic hexagonal ferrite sintered ceramics capable of keeping a real part of permeability thereof substantially constant in a frequency range of several hundreds MHz without lowering. Namely, when the soft-magnetic hexagonal ferrite sintered ceramics are used as inductor elements, it is possible to use signals having a frequency range of several hundreds MHz.

However, the soft-magnetic hexagonal ferrite sintered ceramics have such a disadvantage that the sintering density thereof is as low as about $4.9 \times 10^3$ kg/m$^3$ at most, thereby rendering the sintered ceramics practically unusable. As to this fact, Japanese Patent Application Laid-Open (KOKAI) No. 2001-39718 describes that "hexagonal ferrite has a low sintering density despite excellent permeability in a higher frequency range, resulting in insufficient mechanical strength of the obtained sintered ceramics, and it has been, therefore, difficult to use the hexagonal ferrite as surface mounting parts of electronic devices".

Since the soft-magnetic cubic spinel ferrite sintered ceramics presently used have a sintering density of not less than $5.0 \times 10^3$ kg/m$^3$, it has been strongly required that the soft-magnetic hexagonal ferrite sintered ceramics also exhibit a high sintering density substantially identical to that of the soft-magnetic cubic spinel ferrite sintered ceramics. Also, the sintering density and permeability of the soft-magnetic hexagonal ferrite sintered ceramics have a specific close relationship to each other. Therefore, when the sintering density becomes lower, it may be difficult to exhibit a good permeability inherent to the soft-magnetic hexagonal ferrite sintered ceramics.

In addition, the soft-magnetic hexagonal ferrite sintered ceramics have such a disadvantage that the volume resistivity thereof is as low as $1\times10^5$ Ωm at most, resulting in defective insulation. As to this fact, the above Japanese Patent Application Laid-Open (KOKAI) No. 2001-39718 describes that "hexagonal ferrite . . . . In addition, since the hexagonal ferrite has a low resistivity as compared to spinel ferrite, it may be required to take sufficient measures for insulation upon the production of coils, resulting in troublesome production process".

Since the soft-magnetic cubic spinel ferrite sintered ceramics (Ni-Zn-based sintered ceramics) presently used have a volume resistivity of $1\times10^6$ Ωm or higher, the soft-magnetic hexagonal ferrite sintered ceramics have also been strongly required to have the substantially same high volume resistivity as that of the soft-magnetic cubic spinel ferrite sintered ceramics.

Further, the soft-magnetic hexagonal ferrite sintered ceramics have been required to not only have enhanced sintering density and volume resistivity, but also exhibit a small imaginary part of permeability thereof at 400 MHz and a large imaginary part of permeability at a frequency near several GHz in order to obtain impedance elements and electromagnetic wave absorbers capable of attenuating and absorbing noises and electromagnetic waves in a frequency range near several GHz without adversely affecting signals and electromagnetic waves having a frequency range of several hundreds MHz, as described above.

In addition to the enhanced sintering density and volume resistivity, in order to obtain inductor elements applicable to a frequency range up to several hundreds MHz, the soft-magnetic hexagonal ferrite sintered ceramics have been required to keep a constant real part of permeability thereof in a frequency range of from low frequency to several hundreds MHz without lowering.

Conventionally, there have been proposed various methods for improving the sintering density and volume resistivity of the soft-magnetic hexagonal ferrite sintered ceramics. In Japanese Patent Application Laid-Open (KOKAI) No. 10-92624(1998), there is described the soft-magnetic hexagonal ferrite sintered ceramics containing $SiO_2$ and PbO, and having a sintering density of $4.6\times10^3$ to $4.9\times10^3$ kg/m$^3$ and a volume resistivity of not less than $10^4$ Ωm.

In Japanese Patent Application Laid-Open (KOKAI) No. 9-110432(1997), there is described the soft-magnetic hexagonal ferrite sintered ceramics containing $SiO_2$ and CaO and having a sintering density of $4.6\times10^3$ to $5.3\times10^3$ kg/m$^3$ and a volume resistivity of $1\times10^5$ to $1\times10^6$ Ωm.

In the above Japanese Patent Application Laid-Open (KOKAI) No. 2001-39718, there is also described the soft-magnetic hexagonal ferrite sintered ceramics containing $Mn_3O_4$, $Bi_2O_3$ and CuO.

In Japanese Patent Application Laid-Open (KOKAI) No. 2001-15913, there is described the method for producing a laminated chip element by integrally laminating a sheet or paste for magnetic layer made of soft-magnetic hexagonal ferrite having a Z-type ferrite main phase containing at least one material selected from the group consisting of borosilicate glass, zinc borosilicate glass, CuO and $Bi_2O_3$, on an Ag or Ag alloy paste for internal electrode, and then sintering the resultant laminated body at a temperature not more than the melting point of Ag or Ag alloy, i.e., at a temperature of not more than 960° C.

At present, it has been strongly required to provide soft-magnetic hexagonal ferrite sintered ceramics not only having a high sintering density and a high volume resistivity, but also exhibiting such frequency characteristics that the imaginary part of permeability thereof is sufficiently small in a frequency range of several hundreds MHz and becomes large at a frequency near several GHz while keeping the real part of permeability substantially constant in a frequency range of from low frequency to several hundreds MHz without lowering. However, soft-magnetic hexagonal ferrite sintered ceramics satisfying such properties have not been obtained.

That is, the above Japanese Patent Application Laid-Open (KOKAI) No. 10-92624(1998) aims at obtaining the soft-magnetic hexagonal ferrite sintered ceramics having both a high sintering density and a high volume resistivity. However, the obtained soft-magnetic hexagonal ferrite sintered ceramics is still unsatisfactory in these properties. In addition, the soft-magnetic hexagonal ferrite sintered ceramics must be handled carefully since harmful PbO is contained therein.

The above Japanese Patent Application Laid-Open (KOKAI) No. 9-110432(1997) also aims at obtaining the soft-magnetic hexagonal ferrite sintered ceramics having both a high sintering density and a high volume resistivity. However, the obtained soft-magnetic hexagonal ferrite sintered ceramics is still unsatisfactory in these properties, in particular, in volume resistivity.

Further, the soft-magnetic hexagonal ferrite sintered ceramics described in Japanese Patent Application Laid-Open (KOKAI) No. 2001-39718, is improved in sintering density and volume resistivity as well as frequency characteristics of permeability thereof. However, the obtained soft-magnetic hexagonal ferrite sintered ceramics fails to show a sufficiently small imaginary part of permeability in a frequency range of several hundreds MHz.

In addition, the soft-magnetic hexagonal ferrite sintered ceramics described in Japanese Patent Application Laid-Open (KOKAI) No. 2002-15913 can be produced at a sintering temperature as low as not more than 960° C., but fails to show a sufficient volume resistivity as described below in Comparative Example 11.

As a result of the present inventors' earnest studies for solving the above problems, it has been found that by sintering soft-magnetic hexagonal ferrite composite particles comprising 100 parts by weight of soft-magnetic hexagonal ferrite particles containing Z-type ferrite, Y-type ferrite or W-type ferrite as a main phase, 0.3 to 10 parts by weight of barium carbonate particles and/or strontium carbonate particles and 0.1 to 5 parts by weight of silicon dioxide particles, the obtained soft-magnetic hexagonal ferrite sintered ceramics can exhibit not only a high sintering density and a high volume resistivity, but also have such frequency characteristics that the imaginary part of permeability thereof is sufficiently small in a frequency range of several hundreds MHz and becomes large at a frequency near several GHz. The present invention has been attained on the basis of this finding.

SUMMARY OF THE INVENTION

An object of the present invention is to provide soft-magnetic hexagonal ferrite composite particles used as a raw material for producing a soft-magnetic hexagonal ferrite sintered ceramics capable of exhibiting not only a high sintering density and a high volume resistivity, but also such frequency characteristics that the imaginary part of permeability thereof is sufficiently small in a frequency range of several hundreds MHz and becomes large at a frequency near several GHz.

Another object of the present invention is to provide a soft-magnetic hexagonal ferrite sintered ceramics capable of exhibiting not only a high sintering density and a high volume resistivity, but also such frequency characteristics that the imaginary part of permeability thereof is sufficiently small in a frequency range of several hundreds MHz and becomes large at a frequency near several GHz.

A further object of the present invention is to provide a green sheet containing the soft-magnetic hexagonal ferrite composite particles which is used as a raw material for producing a laminated chip element.

To accomplish the aims, in a first aspect of the present invention, there are provided soft-magnetic hexagonal ferrite composite particles comprising: 100 parts by weight of soft-magnetic hexagonal ferrite particles containing Z-type ferrite, Y-type ferrite or W-type ferrite as a main phase; 0.3 to 10 parts by weight of barium carbonate particles, strontium carbonate particles or a mixture thereof; and 0.1 to 5 parts by weight of silicon dioxide particles.

In a second aspect of the present invention, there are provided soft-magnetic hexagonal ferrite composite particles comprising: 100 parts by weight of soft-magnetic hexagonal ferrite particles containing Z-type ferrite, Y-type ferrite or W-type ferrite as a main phase; 0.3 to 10 parts by weight of barium carbonate particles, strontium carbonate particles or a mixture thereof; 0.1 to 5 parts by weight of silicon dioxide particles; 1 to 20 parts by weight of bismuth oxide particles; and 0.3 to 7 parts by weight of copper oxide particles.

In a third aspect of the present invention, there is provided a green sheet comprising a binder and the soft-magnetic hexagonal ferrite composite particles comprising: 100 parts by weight of soft-magnetic hexagonal ferrite particles containing Z-type ferrite, Y-type ferrite or W-type ferrite as a main phase; 0.3 to 10 parts by weight of barium carbonate particles, strontium carbonate particles or a mixture thereof; and 0.1 to 5 parts by weight of silicon dioxide particles.

In a fourth aspect of the present invention, there is provided a green sheet comprising a binder and the soft-magnetic hexagonal ferrite composite particles comprising: 100 parts by weight of soft-magnetic hexagonal ferrite particles containing Z-type ferrite, Y-type ferrite or W-type ferrite as a main phase; 0.3 to 10 parts by weight of barium carbonate particles, strontium carbonate particles or a mixture thereof; 0.1 to 5 parts by weight of silicon dioxide particles; 1 to 20 parts by weight of bismuth oxide particles; and 0.3 to 7 parts by weight of copper oxide particles.

In a fifth aspect of the present invention, there is provided a soft-magnetic hexagonal ferrite sintered ceramics having a sintering density of not less than $5.0 \times 10^3$ kg/m$^3$, a volume resistivity of not less than $1 \times 10^6$ $\Omega$m and an imaginary part of permeability at 400 MHz of not more than 1, which is produced by forming the soft-magnetic hexagonal ferrite composite particles comprising: 100 parts by weight of soft-magnetic hexagonal ferrite particles containing Z-type ferrite, Y-type ferrite or W-type ferrite as a main phase; 0.3 to 10 parts by weight of barium carbonate particles, strontium carbonate particles or a mixture thereof; and 0.1 to 5 parts by weight of silicon dioxide particles, into a compact, and then sintering the compact.

In a sixth aspect of the present invention, there is provided a soft-magnetic hexagonal ferrite sintered ceramics having a sintering density of not less than $5.0 \times 10^3$ kg/m$^3$, a volume resistivity of not less than $1 \times 10^6$ $\Omega$m and an imaginary part of permeability at 400 MHz of not more than 1, which is produced by forming the soft-magnetic hexagonal ferrite composite particles comprising: 100 parts by weight of soft-magnetic hexagonal ferrite particles containing Z-type ferrite, Y-type ferrite or W-type ferrite as a main phase; 0.3 to 10 parts by weight of barium carbonate particles, strontium carbonate particles or a mixture thereof; 0.1 to 5 parts by weight of silicon dioxide particles; 1 to 20 parts by weight of bismuth oxide particles; and 0.3 to 7 parts by weight of copper oxide particles into a compact, and then sintering the compact.

In a seventh aspect of the present invention, there is provided a soft-magnetic hexagonal ferrite sintered ceramics having a sintering density of not less than $5.0 \times 10^3$ kg/m$^3$, a volume resistivity of not less than $1 \times 10^6$ $\Omega$m and an imaginary part of permeability at 400 MHz of not more than 1, which is produced by laminating a green sheet comprising a binder and the soft-magnetic hexagonal ferrite composite particles comprising: 100 parts by weight of soft-magnetic hexagonal ferrite particles containing Z-type ferrite, Y-type ferrite or W-type ferrite as a main phase; 0.3 to 10 parts by weight of barium carbonate particles, strontium carbonate particles or a mixture thereof; and 0.1 to 5 parts by weight of silicon dioxide particles, and then sintering the resultant laminate.

In an eighth aspect of the present invention, there is provided a soft-magnetic hexagonal ferrite sintered ceramics having a sintering density of not less than $5.0 \times 10^3$ kg/m$^3$, a volume resistivity of not less than $1 \times 10^6$ $\Omega$m and an imaginary part of permeability at 400 MHz of not more than 1, which is produced by laminating a green sheet comprising a binder and the soft-magnetic hexagonal ferrite composite particles comprising: 100 parts by weight of soft-magnetic hexagonal ferrite particles containing Z-type ferrite, Y-type ferrite or W-type ferrite as a main phase; 0.3 to 10 parts by weight of barium carbonate particles, strontium carbonate particles or a mixture thereof; 0.1 to 5 parts by weight of silicon dioxide particles; 1 to 20 parts by weight of bismuth oxide particles; and 0.3 to 7 parts by weight of copper oxide particles, and then sintering the resultant laminate.

DETAILED DESCRIPTION OF THE INVENTION

Figure 1:
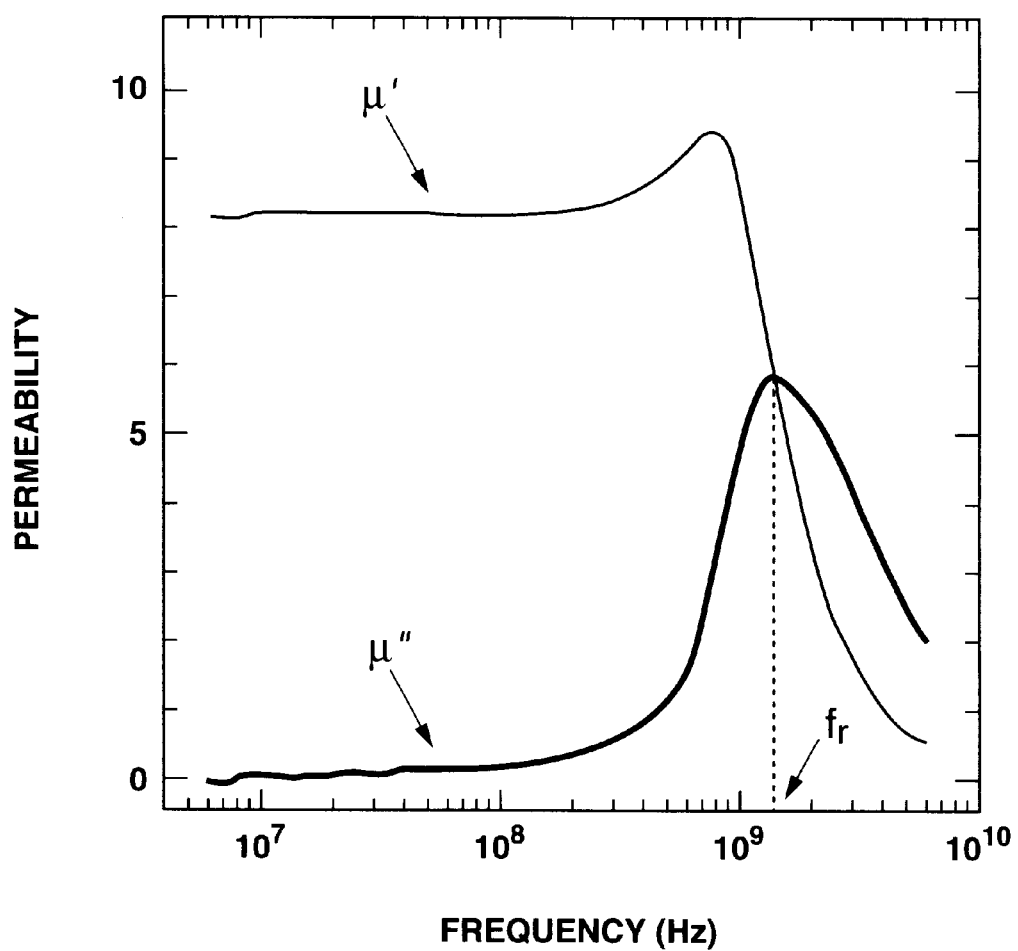
FIG. 1 is a graph showing frequency characteristics of permeability of the soft-magnetic hexagonal ferrite sintered ceramics obtained in Example 1.

The present invention will be described in detail below.

First, the soft-magnetic hexagonal ferrite composite particles of the present invention are described.

The soft-magnetic hexagonal ferrite composite particles of the present invention are (1) composite particles comprising 100 parts by weight of soft-magnetic hexagonal ferrite particles containing Z-type ferrite, Y-type ferrite or W-type ferrite as a main phase, usually 0.3 to 10 parts by weight, preferably 1 to 10 parts by weight of barium carbonate particles and/or strontium carbonate particles, and usually 0.1 to 5 parts by weight, preferably 0.5 to 5 parts by weight of silicon dioxide particles (first aspect), or (2) composite particles comprising 100 parts by weight of soft-magnetic hexagonal ferrite particles containing Z-type ferrite, Y-type ferrite or W-type ferrite as a main phase, usually 0.3 to 10 parts by weight, preferably 0.3 to 7 parts by weight of barium carbonate particles and/or strontium carbonate particles, usually 0.1 to 5 parts by weight of silicon dioxide particles, usually 1 to 20 parts by weight of bismuth oxide particles, and usually 0.3 to 7 parts by weight of copper oxide particles (second aspect).

The soft-magnetic hexagonal ferrite particles containing Z-type ferrite as a main phase, have a composition comprising AO wherein A represents Ba, Sr or Ba—Sr, in an amount of usually 15 to 25 mol %, preferably 16 to 22 mol % (calculated as oxide); $Me^1O$ wherein $Me^1$ represents Co and at least one element selected from the group consisting of Ni, Zn, Cu, Mg and Mn, in an amount of usually 5 to 15 mol %, preferably 8 to 14 mol % (calculated as oxide), with the proviso that the Co content is usually at least 30 mol % based on the total amount of $Me^1$; and $Fe_2O_3$ in an amount of usually 65 to 75 mol %, preferably 67 to 73 mol % (calculated as oxide). When the composition is out of the above-specified range, the obtained soft-magnetic hexagonal ferrite particles tends to contain in addition to the Z-type ferrite main phase, a large amount of Y-type ferrite and W-type ferrite as subphases, thereby failing to exhibit good frequency characteristics of permeability inherent to the Z-type ferrite sintered ceramics.

The soft-magnetic hexagonal ferrite particles containing Y-type ferrite as a main phase, have a composition comprising AO wherein A represents Ba, Sr or Ba—Sr, in an amount of usually 10 to 30 mol %, preferably 13 to 27 mol % (calculated as oxide); $Me^2O$ wherein $Me^2$ represents at least one element selected from the group consisting of Ni, Zn, Cu, Mg and Mn, in an amount of usually 10 to 30 mol %, preferably 13 to 27 mol % (calculated as oxide); and $Fe_2O_3$ in an amount of usually 55 to 65 mol %, preferably 57 to 63 mol % (calculated as oxide). When the composition is out of the above-specified range, the obtained soft-magnetic hexagonal ferrite particles tend to contain in addition to the Y-type ferrite main phase, a large amount of Z-type ferrite and W-type ferrite as subphases, thereby failing to exhibit good frequency characteristics of permeability inherent to the Y-type ferrite sintered ceramics.

The soft-magnetic hexagonal ferrite particles containing W-type ferrite as a main phase have a composition comprising AO wherein A represents Ba, Sr or Ba—Sr, in an amount of usually 5 to 14 mol %, preferably 7 to 13 mol % (calculated as oxide); $Me^1O$ wherein $Me^1$ represents Co and at least one element selected from the group consisting of Ni, Zn, Cu, Mg and Mn, in an amount of usually 10 to 30 mol %, preferably 13 to 27 mol % (calculated as oxide), with the proviso that the Co content is usually at least 30 mol % based on the total amount of $Me^1$; and $Fe_2O_3$ in an amount of usually 65 to 80 mol %, preferably 66 to 77 mol % (calculated as oxide). When the composition is out of the above-specified range, the obtained soft-magnetic hexagonal ferrite particles tend to contain in addition to the W-type ferrite main phase, a large amount of Z-type ferrite and Y-type ferrite as subphases, thereby failing to exhibit good frequency characteristics of permeability inherent to the W-type ferrite sintered ceramics.

The structure of the main phase of the soft-magnetic hexagonal ferrite particles may be determined by an X-ray diffraction method. More specifically, those particles exhibiting the strongest reflected ray intensity from (1 0 16) plane of Z-type ferrite phase are determined to be soft-magnetic hexagonal ferrite particles containing Z-type ferrite as a main phase; those particles exhibiting the strongest reflected ray intensity from (1 0 13) plane of Y-type ferrite phase are determined to be soft-magnetic hexagonal ferrite particles containing Y-type ferrite as a main phase; and those particles exhibiting the strongest reflected ray intensity from (1 1 6) plane of W-type ferrite phase are determined to be soft-magnetic hexagonal ferrite particles containing W-type ferrite as a main phase.

The amount of each subphase contained in the soft-magnetic hexagonal ferrite particles containing Z-type ferrite, Y-type ferrite or W-type ferrite as a main phase is expressed by a relative intensity calculated assuming that the strongest reflected ray intensity due to the main phase is 1. The total relative intensity of the respective subphases is preferably not more than 0.7, more preferably not more than 0.65. When the total relative intensity of the subphases is more than the above-specified range, it may be difficult to attain frequency characteristics of permeability inherent to each main phase. The lower limit of the total relative intensity of the subphases is 0.

The soft-magnetic hexagonal ferrite composite particles containing Z-type ferrite, Y-type ferrite or W-type ferrite as a main phase can be produced by mixing oxides, carbonates, oxalates, hydroxides, etc. of respective elements as raw materials together at the above-specified mixing ratio; calcining the resultant mixture in atmospheric air at a temperature of 1,100 to 1,300° C. for 1 to 20 hours by ordinary method; and then pulverizing the obtained calcined product. Meanwhile, the optimum calcination temperatures for producing the soft-magnetic hexagonal ferrite composite particles containing Z-type ferrite as a main phase is about 1,250° C., the optimum calcination temperatures for producing the soft-magnetic hexagonal ferrite composite particles containing Y-type ferrite as a main phase is about 1,200° C., and the optimum calcination temperatures for producing the soft-magnetic hexagonal ferrite composite particles containing W-type ferrite as a main phase is about 1,250° C.

The barium carbonate particles or the strontium carbonate particles used as raw materials in the present invention, have an average particle diameter of preferably 0.5 to 50 μm, more preferably 0.5 to 40 μm; and a BET specific surface area of preferably 0.1 to 40 m²/g, more preferably 0.1 to 30 m²/g.

In the production of the soft-magnetic hexagonal ferrite composite particles of the first aspect, the amount of the barium carbonate particles and/or the strontium carbonate particles blended is usually 0.3 to 10 parts by weight, preferably 1 to 10 parts by weight, more preferably 1 to 7 parts by weight based on 100 parts by weight of the soft-magnetic hexagonal ferrite particles. When the amount of the barium carbonate particles and/or the strontium carbonate particles blended is out of the above-specified range, it may be difficult to obtain a soft-magnetic hexagonal ferrite sintered ceramics having a sintering density of not less than $5.0 \times 10^3$ kg/m³ as aimed by the present invention, so that the obtained soft-magnetic hexagonal ferrite sintered ceramics tends to become insufficient in mechanical strength.

In the production of the soft-magnetic hexagonal ferrite composite particles of the second aspect, the amount of the barium carbonate particles and/or the strontium carbonate particles blended is usually 0.3 to 10 parts by weight, preferably 0.3 to 7 parts by weight, more preferably 0.5 to 5 parts by weight based on 100 parts by weight of the soft-magnetic hexagonal ferrite particles. When the amount of the barium carbonate particles and/or the strontium carbonate particles blended is out of the above-specified range, it may be difficult to obtain a soft-magnetic hexagonal ferrite sintered ceramics having a sintering density of not less than $5.0 \times 10^3$ kg/m$^3$ as aimed by the present invention, so that the obtained soft-magnetic hexagonal ferrite sintered ceramics tends to become insufficient in mechanical strength.

The silicon dioxide particles used as raw material in the present invention have an average particle diameter of preferably 0.5 to 50 μm, more preferably 1 to 40 μm.

In the production of the soft-magnetic hexagonal ferrite composite particles of the first aspect, the amount of the silicon dioxide particles blended is usually 0.1 to 5 parts by weight, preferably 0.5 to 5 parts by weight, more preferably 0.7 to 4 parts by weight based on 100 parts by weight of the soft-magnetic hexagonal ferrite particles.

In the production of the soft-magnetic hexagonal ferrite composite particles of the second aspect, the amount of the silicon dioxide particles blended is usually 0.1 to 5 parts by weight, preferably 0.1 to 4 parts by weight based on 100 parts by weight of the soft-magnetic hexagonal ferrite particles.

When the amount of the silicon dioxide particles blended is less than 0.1 part by weight, it may be difficult to obtain a soft-magnetic hexagonal ferrite sintered ceramics having a volume resistivity of not less than $1 \times 10^6$ Ωm as aimed by the present invention. Further, the obtained soft-magnetic hexagonal ferrite sintered ceramics has an imaginary part of permeability at 400 MHz of more than 1, resulting in increased magnetic loss in a frequency range of several hundreds MHz. As a result, it may be difficult to apply signals having such a frequency range to the soft-magnetic hexagonal ferrite sintered ceramics. When the amount of the silicon dioxide particles blended is more than 5 parts by weight, although the imaginary part of permeability at 400 MHz is less than 1, it may be difficult to obtain a soft-magnetic hexagonal ferrite sintered ceramics having a sintering density of not less than $5.0 \times 10^3$ kg/m$^3$ as aimed by the present invention, so that the obtained soft-magnetic hexagonal ferrite sintered ceramics tends to become insufficient in mechanical strength.

The bismuth oxide particles blended have an average particle diameter of preferably 0.5 to 30 μm, more preferably 0.5 to 20 μm; and a BET specific surface area of preferably 0.1 to 30 m$^2$/g, more preferably 0.1 to 20 m$^2$/g.

The amount of the bismuth oxide particles blended is usually not more than 20 parts by weight, preferably 1 to 20 parts by weight, more preferably 2 to 17 parts by weight based on 100 parts by weight of the soft-magnetic hexagonal ferrite particles.

When the amount of the bismuth oxide particles blended is less than 1 part by weight, it may be difficult to obtain a soft-magnetic hexagonal ferrite sintered ceramics having a sintering density of not less than $5.0 \times 10^3$ kg/m$^3$ as aimed by the present invention, so that the obtained soft-magnetic hexagonal ferrite sintered ceramics tends to become insufficient in mechanical strength.

When the amount of the bismuth oxide particles blended is more than 20 parts by weight, both the imaginary part and real part of permeability become small, so that the obtained sintered ceramics may fail to show functions required for impedance elements, electromagnetic wave absorbers and inductor elements.

The copper oxide particles blended have an average particle diameter of preferably 0.1 to 30 μm, more preferably 0.1 to 20 μm; and a BET specific surface area of preferably 0.1 to 30 m$^2$/g, more preferably 0.1 to 20 m$^2$/g.

The amount of the copper oxide particles blended is usually not more than 7 parts by weight, preferably 0.3 to 7 parts by weight, more preferably 0.5 to 5 parts by weight based on 100 parts by weight of the soft-magnetic hexagonal ferrite particles.

When the amount of the copper oxide particles blended is less than 0.3 part by weight, it may be difficult to obtain a soft-magnetic hexagonal ferrite sintered ceramics having a sintering density of not less than $5.0 \times 10^3$ kg/m$^3$ as aimed by the present invention, so that the obtained soft-magnetic hexagonal ferrite sintered ceramics tends to become insufficient in mechanical strength.

When the amount of the copper oxide particles blended is more than 7 parts by weight, both the imaginary part and real part of permeability become small, so that the obtained sintered ceramics may fail to show functions required for impedance elements, electromagnetic wave absorbers and inductor elements. Further, it may be difficult to obtain a soft-magnetic hexagonal ferrite sintered ceramics having a volume resistivity of not less than $1 \times 10^6$ Ωm as aimed by the present invention.

As to the blending ratio between the bismuth oxide particles and the copper oxide particles, the amount of the bismuth oxide particles is usually 1.5 to 20 parts by weight, preferably 2.0 to 18 parts by weight based on one part by weight of the copper oxide particles.

When the amount of the bismuth oxide particles is less than 1.5 parts by weight based one part by weight of the copper oxide particles, it may be difficult to obtain a soft-magnetic hexagonal ferrite sintered ceramics having a volume resistivity of not less than $1 \times 10^6$ Ωm as aimed by the present invention.

When the amount of the bismuth oxide particles is more than 20 parts by weight based one part by weight of the copper oxide particles, it may be difficult to obtain a soft-magnetic hexagonal ferrite sintered ceramics having a sintering density of not less than $5.0 \times 10^3$ kg/m$^3$ as aimed by the present invention, so that the obtained soft-magnetic hexagonal ferrite sintered ceramics tends to become insufficient in mechanical strength.

The soft-magnetic hexagonal ferrite composite particles of the present invention have an average particle diameter of preferably 0.1 to 30 μm, more preferably 0.1 to 20 μm; and a BET specific surface area of preferably 0.1 to 40 m$^2$/g, more preferably 0.5 to 40 m$^2$/g. As to the magnetic properties of the soft-magnetic hexagonal ferrite composite particles, the saturation magnetization thereof is preferably 20 to 60 Am$^2$/kg, more preferably 25 to 55 Am$^2$/kg; and the coercive force thereof is preferably 0.50 to 50 kA/m, more preferably 1.0 to 30 kA/m.

When the average particle diameter and BET specific surface area of the soft-magnetic hexagonal ferrite composite particles are out of the above-specified range, it may be difficult to uniformly disperse the soft-magnetic hexagonal ferrite composite particles in a coating material upon the below-mentioned production process of the green sheet, so that the sintered ceramics obtained using such composite particles tends to exhibit uneven properties.

Also, when the saturation magnetization and coercive force of the soft-magnetic hexagonal ferrite composite particles are out of the above-specified ranges, it may be difficult to obtain the soft-magnetic hexagonal ferrite sintered ceramics as aimed by the present invention.

Next, the green sheet of the present invention is described. The green sheet described herein is a raw material used for production of laminated chip elements, and is a sheet material produced by blending the soft-magnetic hexagonal ferrite composite particles with a binder, a plasticizer, a solvent and the like to form a coating material, forming the coating material into a film having a thickness of several μm to several hundreds μm, and then drying the resultant film. The thus obtained green sheets are laminated on an electrode so as to sandwich the electrode therebetween and the obtained laminate is sintered, thereby obtaining a laminated chip element.

The green sheet of the present invention comprises 100 parts by weight of the soft-magnetic hexagonal ferrite composite particles containing Z-type ferrite, Y-type ferrite or W-type ferrite as a main phase; preferably 2 to 20 parts by weight, more preferably 4 to 15 parts by weight of a binder; and preferably 0.5 to 15 parts by weight, more preferably 2 to 10 parts by weight of a plasticizer. Further, the green sheet may contain a residual solvent due to insufficient drying after the film formation.

Examples of the binder may include polyvinyl butyral, polyacrylic acid esters, polymethyl methacrylate, vinyl chloride, polymethacrylic acid esters, ethyl cellulose, abietic acid resins or the like. Among these binders, polyvinyl butyral is preferred.

When the amount of the binder blended is less than 2 parts by weight, the obtained green sheet tends to become brittle. The upper limit of the binder blended is 20 parts by weight since such an amount is sufficient to obtain a green sheet having a good mechanical strength.

Examples of the plasticizer may include n-butyl benzyl phthalate, dibutyl phthalate, dimethyl phthalate, polyethylene glycol, phthalic acid esters, butyl stearate, methyl adipate or the like. Among these plasticizers, n-butyl benzyl phthalate is preferred.

When the amount of the plasticizer blended is less than 0.5 part by weight, the obtained green sheet tends to become too hard and suffer from cracks. When the amount of the plasticizer blended is more than 15 part by weight, the obtained green sheet tends to become too soft.

Upon the production of the green sheet of the present invention, a suitable solvent may be used in an amount of usually 20 to 150 parts by weight, preferably 30 to 120 parts by weight based on 100 parts by weight of the soft-magnetic hexagonal ferrite composite particles containing Z-type ferrite, Y-type ferrite or W-type ferrite as a main phase. When the amount of the solvent used is out of the above-specified range, it may be difficult to obtain a uniform green sheet, and the obtained sintered ceramics tends to exhibit uneven properties.

Examples of the solvent usable for production of the green sheet may include acetone, ethyl alcohol, benzene, butanol, ethanol, methyl ethyl ketone, toluene, propyl alcohol or the like. Among these solvents, methyl ethyl ketone and toluene are preferred.

Next, the soft-magnetic hexagonal ferrite sintered ceramics of the present invention is described.

The soft-magnetic hexagonal ferrite sintered ceramics of the present invention has the substantially same composition as described above as to the soft-magnetic hexagonal ferrite particles containing Z-type ferrite, Y-type ferrite or W-type ferrite as a main phase. When the composition of the soft-magnetic hexagonal ferrite sintered ceramics is out of the above-specified range, a large amount of the subphases tend to be produced, thereby failing to exhibit the frequency characteristics of permeability inherent to the main phase.

The soft-magnetic hexagonal ferrite sintered ceramics of the present invention has a sintering density of usually not less than $5.0 \times 10^3$ kg/m$^3$, preferably $5.0 \times 10^3$ to $5.0 \times 10^3$ kg/m$^3$; and a volume resistivity of usually not less than $1 \times 10^6$ Ωm, preferably $1.0 \times 10^6$ to $5 \times 10^9$ Ωm.

When the sintering density of the soft-magnetic hexagonal ferrite sintered ceramics is less than $5.0 \times 10^3$ kg/m$^3$, the obtained sintered ceramics tends to be insufficient in mechanical strength. Although the sintering density is preferably as high as possible from the standpoint of good mechanical strength, the upper limit of the sintering density is $5.3 \times 10^3$ kg/m$^3$ in the consideration of well-balanced properties of the obtained sintered ceramics. When the volume resistivity of the soft-magnetic hexagonal ferrite sintered ceramics is less than $1 \times 10^6$ Ωm, the obtained sintered ceramics tends to suffer from defective insulation. Although the volume resistivity is preferably as high as possible in order to prevent the defective insulation, the upper limit of the volume resistivity is $5 \times 10^9$ Ωm in the consideration of well-balanced properties of the obtained sintered ceramics.

The soft-magnetic hexagonal ferrite sintered ceramics of the present invention has an imaginary part of permeability at 400 MHz of usually not more than 1, preferably not more than 0.7, more preferably not more than 0.5. In addition, the real part of permeability of the soft-magnetic hexagonal ferrite sintered ceramics can be kept substantially constant in a frequency range of from low frequency to several hundreds MHz without lowering.

Figure 3:
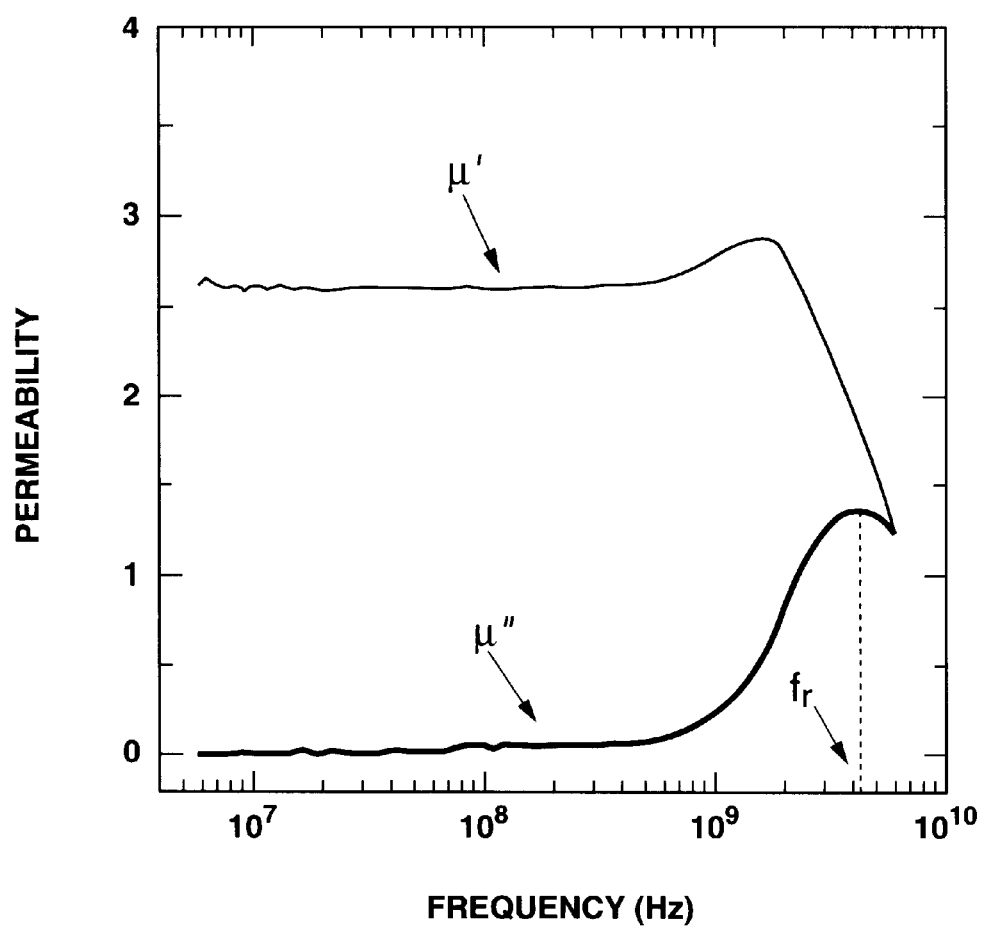
FIG. 3 is a graph showing frequency characteristics of permeability of the soft-magnetic hexagonal ferrite sintered ceramics obtained in Example 2.

Then, the frequency characteristics of permeability of the soft-magnetic hexagonal ferrite sintered ceramics of the present invention are explained in detail below. The frequency characteristics of permeability of the soft-magnetic hexagonal ferrite sintered ceramics obtained in Example 1 below is shown in FIG. 1. In FIG. 1, the thin line indicates the change in real part of permeability (hereinafter referred to merely $\mu'$) while the thick line indicates the change in imaginary part of permeability (hereinafter referred to merely $\mu''$). As apparent from FIG. 1, $\mu'$ is kept constant on a low frequency side, and after temporarily increasing from about 300 MHz, starts to decrease from about 800 MHz and reaches substantially 1 at about 5 GHz. Whereas, $\mu''$ is substantially zero on a low frequency side, starts to increase from about 300 MHz, and after indicating a maximum value at a resonance frequency ($f_r$=1.4 GHz), gradually decreases on a high frequency side. Also, the frequency characteristics of permeability of the soft-magnetic hexagonal ferrite sintered ceramics obtained in Example 2 below is shown in FIG. 3. In FIG. 3, the thin line indicates the change in real part of permeability ($\mu'$) while the thick line indicates the change in imaginary part of permeability ($\mu''$). As apparent from FIG. 3, $\mu'$ is kept constant on a low frequency side, and after temporarily increasing from about 450 MHz, starts to decrease from about 1.7 GHz and reaches substantially 1 at about 10 GHz. Whereas, $\mu''$ is substantially zero on a low frequency side, starts to increase from about 450 MHz, and after indicating a maximum value at a resonance frequency ($f_r$=4.2 GHz), gradually decrease on a high frequency side.

Figure 2:
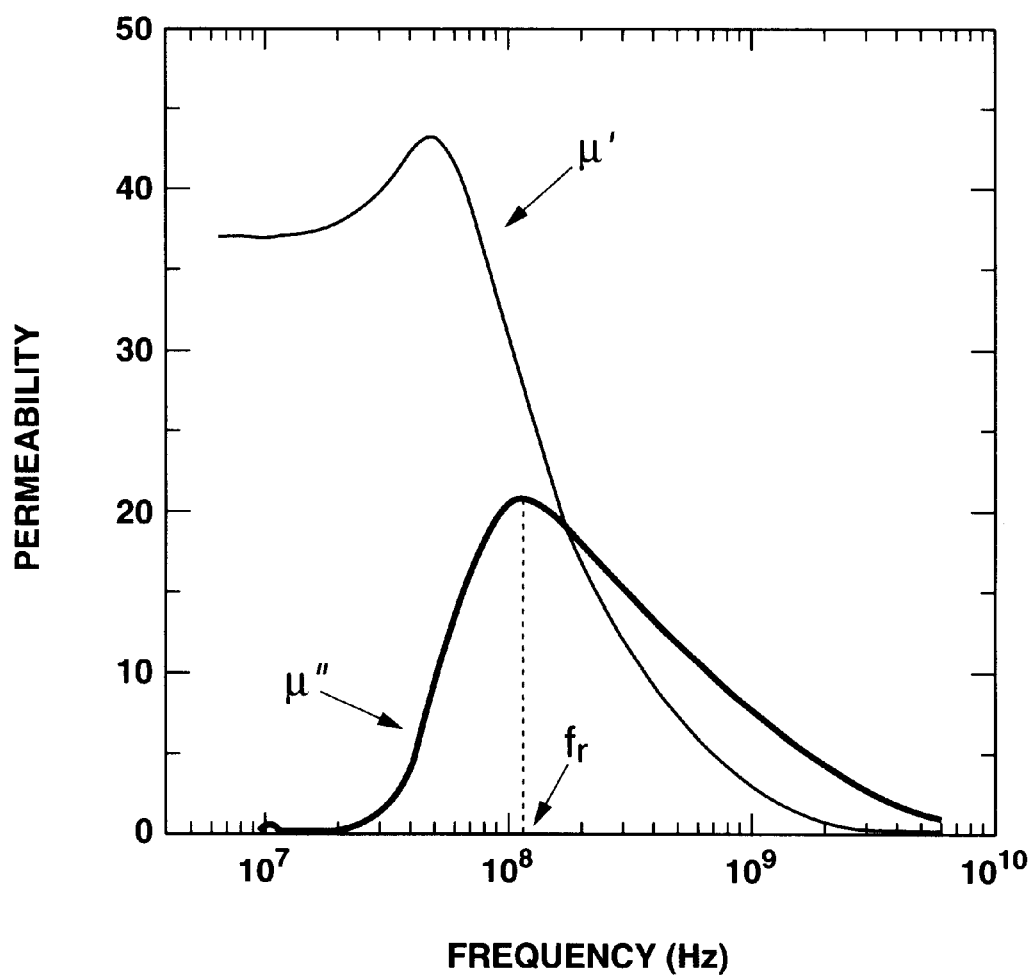
FIG. 2 is a graph showing frequency characteristics of permeability of the conventional soft-magnetic cubic spinel ferrite sintered ceramics obtained in Comparative Example 7.

On the other hand, the frequency characteristics of permeability of the conventional soft-magnetic cubic spinel ferrite sintered ceramics obtained in Comparative Example 7 below is shown in FIG. 2. As shown in FIG. 2, after temporarily increasing from about 15 MHz, $\mu'$ starts to decrease from about 50 MHz and reaches substantially 1 at several GHz. Whereas, $\mu''$ starts to increase from about 20 MHz, and after indicating a maximum value at a resonance frequency ($f_r$=about 100 MHz), gradually decreases on a high frequency side.

That is, it is recognized that the peak of $\mu''$ of the respective soft-magnetic hexagonal ferrite sintered ceramics according to the present invention is offset toward the high frequency side as compared to that of the conventional soft-magnetic cubic spinel ferrite sintered ceramics. In addition, it is also recognized that the frequency range in which $\mu'$ is kept constant without lowering, extends up to the high frequency side.

Here, it is important to notice the frequency characteristics of $\mu''$ corresponding to the magnetic loss. It should be noted that noises produced in such a frequency range where $\mu''$ is kept large can be attenuated by the impedance element. More specifically, in order to allow the intended signals having a frequency range of several hundreds MHz to pass through the sintered ceramics without attenuation, it is required to minimize $\mu''$ in such a frequency range. In addition, in order to attenuate noises produced as harmonic of the signals near several GHz, it is also required to control the frequency characteristics of permeability so as to increase $\mu''$ at a frequency near several GHz, i.e., approach the resonance frequency to about several GHz.

In accordance with the present invention, as shown in FIGS. 1 and 3, $\mu''$ at 400 MHz can be controlled to not more than 1, preferably not more than 0.7, more preferably not more than 0.5, and the resonance frequency can be controlled to not less than several GHz. In addition, in accordance with the present invention, it is possible to control $\mu''$ at the resonance frequency to preferably not less than 0.3.

Further, it is important to notice the frequency characteristics of $\mu'$ corresponding to inductance components. In order to operate the inductor element in a frequency range of several hundreds MHz, it is required that $\mu'$ is kept substantially constant in the frequency range without lowering. In the present invention, as shown in FIGS. 1 and 3, the frequency at which $\mu'$ starts to decrease can be controlled to more than several hundreds MHz.

In the present invention, the values of the imaginary part ($\mu''$) of permeability respectively measured at 400 MHz and the resonance frequency are used as an index indicating a magnitude of the imaginary part of permeability. Also, the frequency from which the real part ($\mu'$) of permeability starts to decrease is used as an index indicating an upper limit of the frequency range where the real part of permeability is kept constant without lowering. In the case of the conventional soft-magnetic hexagonal ferrite sintered ceramics and soft-magnetic cubic spinel ferrite sintered ceramics, $\mu''$ at 400 MHz is more than 1, resulting in large magnetic loss in a frequency range of several hundreds MHz. Therefore, it has not been possible to pass signals having a frequency range of several hundreds MHz through impedance elements produced from such sintered ceramics.

The resonance frequency is preferably not less than 1 GHz. When the resonance frequency is less than 1 GHz, the imaginary part of permeability, i.e., magnetic loss, is increased in a frequency range of several hundreds MHz, resulting in attenuation of signals having such a frequency range of several hundreds MHz.

The imaginary part of permeability at the resonance frequency is preferably not less than 0.3. When the imaginary part of permeability at the resonance frequency is less than 0.3, it may be difficult to sufficiently reduce noises near several GHz.

The frequency at which the real part of permeability starts to decrease, is preferably not less than 500 MHz, more preferably not less than 700 MHz. When the frequency is less than 500 MHz, it may be difficult to keep the real part of permeability constant without lowering over a frequency range of from low frequency to several hundreds MHz.

The soft-magnetic hexagonal ferrite sintered ceramics of the present invention can be produced by molding the soft-magnetic hexagonal ferrite composite particles according to the first aspect of the present invention in a metal mold under a pressure of usually $0.3 \times 10^4$ to $3 \times 10^4$ t/m² by a so-called particle pressure-molding method, or laminating green sheets containing the soft-magnetic hexagonal ferrite composite particles according to the first aspect of the present invention by a so-called green sheet method; and then sintering the obtained molded product or laminate at a temperature of usually 1,100 to 1,300° C. for a period of usually 1 to 20 hours, preferably 2 to 10 hours. Other known molding methods may also be used in the above production process, and among these methods, the above particle pressure-molding method and the green sheet method are preferred. When the sintering temperature is less than 1,100° C., it may be difficult to obtain a soft-magnetic hexagonal ferrite sintered ceramics having a sintering density of not less than $5.0 \times 10^3$ kg/m³ as aimed by the present invention. Even though the sintering temperature is more than 1,300° C., it is possible to obtain the aimed soft-magnetic hexagonal ferrite sintered ceramics. However, the upper limit of the sintering temperature is preferably set to 1,300° C. from industrial and economical viewpoints.

Further, the soft-magnetic hexagonal ferrite sintered ceramics of the present invention can be produced by molding the soft-magnetic hexagonal ferrite composite particles according to the second aspect of the present invention in a metal mold under a pressure of usually $0.3 \times 10^4$ to $3 \times 10^4$ t/m² by a so-called particle pressure-molding method, or laminating green sheets containing the soft-magnetic hexagonal ferrite composite particles according to the second aspect of the present invention by a so-called green sheet method; and then sintering the obtained molded product or laminate at a temperature of usually 800 to 960° C., preferably 830 to 930° C. for a period of usually 1 to 20 hours, preferably 1 to 10 hours. Other known molding methods may also be used in the above production process, among these methods, and the above particle pressure-molding method and the green sheet method are preferred. When the sintering temperature is less than 800° C., it may be difficult to obtain a soft-magnetic hexagonal ferrite sintered ceramics having a sintering density of not less than $5.0 \times 10^3$ kg/m³ as aimed by the present invention. In addition, since silver conductive materials used upon the production of laminated chip elements have a melting point of 960° C., it may be difficult to sinter the soft-magnetic hexagonal ferrite composite particles and the silver conductive materials at a temperature of more than 960° C. at the same time.

The point of the present invention is that by using soft-magnetic hexagonal ferrite composite particles comprising soft-magnetic hexagonal ferrite particles containing Z-type ferrite, Y-type ferrite or W-type ferrite as a main phase, barium carbonate particles and/or strontium carbonate particles and silicon dioxide particles at a specific blending ratio, it is possible to obtain a soft-magnetic hexagonal ferrite sintered ceramics capable of exhibiting a sintering density of usually not less than $5.0 \times 10^3$ kg/m³, a volume resistivity of usually not less than $1 \times 10^6$ Ωm and an imaginary part of permeability at 400 MHz of usually not more than 1.

The reason why the soft-magnetic hexagonal ferrite sintered ceramics of the present invention can exhibit a high sintering density and a high volume resistivity, is considered to be due to the following synergistic effect. That is, the sintering between the crystal grains can be promoted by specific amounts of barium carbonate, etc. preliminarily blended, and the specific amount of silicon dioxide also preliminarily blended can be selectively introduced at the grain boundary so as to function as an insulating layer.

Also, another point of the present invention is that by using soft-magnetic hexagonal ferrite composite particles comprising soft-magnetic hexagonal ferrite particles containing Z-type ferrite, Y-type ferrite or W-type ferrite as a main phase, barium carbonate particles and/or strontium carbonate particles, silicon dioxide particles, bismuth oxide particles and copper oxide particles at a specific blending ratio, it is possible to produce a soft-magnetic hexagonal ferrite sintered ceramics capable of exhibiting a sintering density as high as not less than $5.0 \times 10^3$ kg/m$^3$, a volume resistivity as high as not less than $1 \times 10^6$ Ωm and an imaginary part of permeability at 400 MHz of not more than 1 while keeping a real part of permeability substantially constant in a frequency range of from low frequency to several hundreds MHz without lowering, by sintering at a temperature as low as not more than 960° C.

The reason why the soft-magnetic hexagonal ferrite sintered ceramics of the present invention exhibiting a high sintering density and a high volume resistivity can be produced at a low sintering temperature, is considered follows. That is, the sintering between the crystal grains is promoted by specific amounts of the carbonate, bismuth oxide and copper oxide preliminarily blended, so that the sintering density of the obtained sintered ceramics can be enhanced. Further, the specific amount of silicon dioxide preliminarily blended is selectively introduced at the grain boundary so as to act as an insulating layer, so that the volume resistivity of the obtained sintered ceramics can be enhanced.

The reason why the soft-magnetic hexagonal ferrite sintered ceramics of the present invention can exhibit an imaginary part of permeability at 400 MHz of not more than 1, is considered as follows. That is, the silicon dioxide selectively introduced at the grain boundary interrupts a magnetic circuit formed in the sintered ceramics, resulting in formation of a diamagnetic field therein. The thus produced diamagnetic field shifts the resonance frequency toward the high frequency side.

Thus, when the soft-magnetic hexagonal ferrite composite particles according to the first aspect of the present invention are used, it is possible to produce a soft-magnetic hexagonal ferrite sintered ceramics capable of exhibiting a high sintering density and a high volume resistivity as well as such frequency characteristics that the imaginary part of permeability is sufficiently small in a frequency range of several hundreds MHz and becomes large at a frequency near several GHz while keeping a real part of permeability substantially constant in a frequency range of from low frequency to several hundreds MHz without lowering, in an industrially and economically useful manner.

Also, when the soft-magnetic hexagonal ferrite composite particles according to the second aspect of the present invention are used, it is possible to sinter at a temperature as low as not more than 960° C.

Therefore, the obtained soft-magnetic hexagonal ferrite sintered ceramics can be suitably used as raw materials for impedance elements capable of attenuating noises near several GHz, electromagnetic wave absorbers for absorbing electromagnetic waves, or inductor elements using signals having a frequency range of several hundreds MHz.

EXAMPLES

The present invention is described in more detail by Examples and Comparative Examples, but the Examples are only illustrative and, therefore, not intended to limit the scope of the present invention.

Various properties were evaluated by the following methods.

(1) The average particle diameter of the soft-magnetic hexagonal ferrite composite particles was expressed by the value of $X_{50}$ measured using a laser diffraction-type particle size distribution measuring device (manufactured by Sympatec GmbH).

(2) The BET specific surface area of the particles was measured by a BET method using "Mono Sorb MS-II" (manufactured by Yuasa Ionics Co., Ltd.).

(3) The saturation magnetization and coercive force were respectively expressed by the value measured using a vibrating sample magnetometer "VSM-3S" (manufactured by Toei Kogyo Co., Ltd.) by applying a magnetic field of 10 kOe thereto.

(4) The phase produced was identified using an X-ray diffractometer "RAD-AII" (manufactured by Rigaku Denki Co., Ltd.).

(5) The sintering density was calculated from volume obtained from outer dimensions of a cylindrical sample having a height of 2 mm and a diameter of 25 mm, and weight thereof.

(6) The volume resistivity was calculated from the value measured by a "High-Resistance-Meter 4329A" (manufactured by Agirent Technology Co., Ltd.) and the outer dimensions of the above sample.

(7) The frequency characteristics of permeability were calculated from the values obtained by inserting a ring-shaped sintered ceramics having an outer diameter of 7 mm and an inner diameter of 3 mm into a sample holder (manufactured by Kanto Denshi Oyo Kaihatsu Co., Ltd.) and measuring S parameters of the sample using a "Network Analyzer HP8753C or HP8720D" (manufactured by Agirent Technology Co., Ltd.).

Example 1

<Production of Soft-magnetic Hexagonal Ferrite Composite Particles>

α-Fe$_2$O$_3$, CoCO$_3$ and BaCO$_3$ were weighed so as to obtain a composition containing 18.7 mol % of BaO, 11.6 mol % of CoO and 69.7 mol % of Fe$_2$O$_3$, and mixed together for one hour using a wet attritor. The resultant mixture was filtrated and dried. The obtained raw mixed particles were calcined in atmospheric air at 1,250° C. for 5 hours, thereby obtaining soft-magnetic hexagonal ferrite containing a Z-type ferrite main phase. It was confirmed that assuming that the peak intensity of (1 0 16) plane of Z-type ferrite phase was 1, the peak intensity of (1 0 13) plane of Y-type ferrite phase was 0.54, and the peak intensity of (1 1 6) plane of W-type ferrite phase was 0. Then, 1.5 parts by weight of barium carbonate particles and 0.9 part by weight of silicon dioxide particles were added to 100 parts by weight of the thus obtained soft-magnetic hexagonal ferrite, and the resultant mixture was finely pulverized using a wet-type ball mill, thereby obtaining soft-magnetic hexagonal ferrite composite particles. It was confirmed that the obtained soft-magnetic hexagonal ferrite composite particles had an average particle diameter of 3.0 μm, a BET specific surface area of 3.1 m$^2$/g, a saturation magnetization of 41.0 Am$^2$/kg, and a coercive force of 11.1 kA/m.

<Production of Green Sheet and Green Sheet Laminate>

100 parts by weight of the above-obtained soft-magnetic hexagonal ferrite composite particles, 7 parts by weight of polyvinyl butyral "ESRECK B BL-S" (tradename, produced by Sekisui Kagaku Kogyo Co., Ltd.) as a binder, 4.4 parts by weight of n-butyl benzyl phthalate (reagent produced by Tokyo Kasei Kogyo Co., Ltd.) as a plasticizer, and 30 parts by weight of n-butyl acetate (guaranteed reagent produced by Yoneyama Yakuhin Kogyo Co., Ltd.) and 30 parts by weight of methyl ethyl ketone (produced by Nihon Kaseihin Co., Ltd.) both as solvents, were mixed together for 15 hours using a ball mill, thereby obtaining a coating material. The obtained coating material was applied onto a PET film using a doctor blade-type coater and then dried, thereby obtaining a green sheet having a thickness of 120 $\mu$m. The thus obtained sheet was cut into square sheets having a size of 5 cm×5 cm. Twenty cut sheets obtained were laminated and pressed under a pressure of $0.5\times10^4$ t/m², thereby obtaining a green sheet laminate having a thickness of 1.4 mm.

<Production of Soft-magnetic Hexagonal Ferrite Sintered Ceramics>

The above-obtained green sheet laminate was sintered in atmospheric air at 1,250° C. for 7 hours, thereby obtaining a soft-magnetic hexagonal ferrite sintered ceramics. It was confirmed that the obtained soft-magnetic hexagonal ferrite sintered ceramics had a density of $5.1\times10^3$ kg/m³, a volume resistivity of $1\times10^9$ Ωm, a real part of permeability at 400 MHz of 5.2 and an imaginary part of permeability at 400 MHz of 0.3.

Further, it was confirmed that the resonance frequency was 2.2 GHz, the imaginary part of permeability at the resonance frequency was 3.2, and the frequency at which the real part of permeability started to decrease was 958 MHz.

Example 2

<Production of Soft-magnetic Hexagonal Ferrite Composite Particles>

α-$Fe_2O_3$, $CoCO_3$ and $BaCO_3$ were weighed so as to obtain a composition containing 18.6 mol % of BaO, 11.6 mol % of CoO and 69.8 mol % of $Fe_2O_3$, and mixed together for one hour using a wet attritor. The resultant mixture was filtrated and then dried. The obtained raw mixed particles were calcined in atmospheric air at 1,250° C. for 5 hours, thereby obtaining soft-magnetic hexagonal ferrite containing a Z-type ferrite main phase. It was confirmed that assuming that the peak intensity of (1 0 16) plane of Z-type ferrite phase was 1, the peak intensity of (1 0 13) plane of Y-type ferrite phase was 0.55, and the peak intensity of (1 1 6) plane of W-type ferrite phase was 0. Then, 2.0 parts by weight of barium carbonate particles, 1.0 part by weight of silicon dioxide particles, 8 parts by weight of bismuth oxide particles and 3 parts by weight of copper oxide particles were added to 100 parts by weight of the thus obtained soft-magnetic hexagonal ferrite, and the resultant mixture was finely pulverized using a wet-type ball mill, thereby obtaining soft-magnetic hexagonal ferrite composite particles. It was confirmed that the obtained soft-magnetic hexagonal ferrite composite particles had an average particle diameter of 1.2 $\mu$m, a BET specific surface area of 6.2 m²/g, a saturation magnetization of 35.2 Am²/kg, and a coercive force of 14.7 kA/m.

<Production of Green Sheet and Green Sheet Laminate>

100 parts by weight of the above-obtained soft-magnetic hexagonal ferrite composite particles, 7 parts by weight of polyvinyl butyral "ESRECK B BL-S" (tradename, produced by Sekisui Kagaku Kogyo Co., Ltd.) as a binder, 4.4 parts by weight of n-butyl benzyl phthalate (reagent produced by Tokyo Kasei Kogyo Co., Ltd.) as a plasticizer, and 30 parts by weight of n-butyl acetate (guaranteed reagent produced by Yoneyama Yakuhin Kogyo Co., Ltd.) and 30 parts by weight of methyl ethyl ketone (produced by Nihon Kaseihin Co., Ltd.) both as solvents, were mixed together for 15 hours using a ball mill, thereby obtaining a coating material. The obtained coating material was applied onto a PET film using a doctor blade-type coater and then dried, thereby obtaining a green sheet having a thickness of 100 $\mu$m. The thus obtained sheet was cut into square sheets having a size of 5 cm×5 cm. Twenty cut sheets thus obtained were laminated and pressed under a pressure of $0.5\times10^4$ t/m², thereby obtaining a green sheet laminate having a thickness of 1.2 mm.

<Production of Soft-magnetic Hexagonal Ferrite Sintered Ceramics>

The above-obtained green sheet laminate was sintered in atmospheric air at 900° C. for 3 hours, thereby obtaining a soft-magnetic hexagonal ferrite sintered ceramics. It was confirmed that the obtained soft-magnetic hexagonal ferrite sintered ceramics had a density of $5.1\times10^3$ kg/m³, a volume resistivity of $5\times10^6$ Ωm, a real part of permeability at 400 MHz of 2.6, and an imaginary part of permeability at 400 MHz of 0.05.

Further, it was confirmed that the resonance frequency was 4.2 GHz, the imaginary part of permeability at the resonance frequency was 1.3, and the frequency at which the real part of permeability started to decrease was 1.7 GHz.

Examples 3 to 6, 9 to 12 and 14 to 17 and Comparative Examples 1 to 7

The same procedure as defined in Example 1 was conducted except that composition and amount of soft-magnetic hexagonal ferrite particles, average particle diameter, amount and BET specific surface area of barium carbonate particles, strontium carbonate particles or silicon dioxide particles blended, and pressure used upon lamination of the green sheet using soft-magnetic hexagonal ferrite composite particles, sintering temperature and sintering time of soft-magnetic hexagonal ferrite composite particles, were changed variously. The results are shown in Tables 1 to 6.

Meanwhile, the sintered ceramics obtained in Comparative Example 7 was a typical one of conventionally known soft-magnetic cubic spinel ferrite sintered ceramics.

Example 7

Soft-magnetic hexagonal ferrite composite particles were produced by the same method as defined in Example 1 except that composition and amount of soft-magnetic hexagonal ferrite particles, and average particle diameter, amount and BET specific surface area of barium carbonate particles, strontium carbonate particles or silicon dioxide particles were changed variously. The thus produced soft-magnetic hexagonal ferrite composite particles were filled in a metal mold, and press-molded under a pressure of $1\times10^4$ t/m², thereby obtaining a disk-shaped sample having a diameter of 30 mm and a thickness of 2.5 mm. The obtained disk-shaped sample was sintered in atmospheric air at 1,250° C. for 5 hours, thereby obtaining a soft-magnetic hexagonal ferrite sintered ceramics. It was confirmed that the thus obtained sintered ceramics had a sintering density of $5.2\times10^3$ kg/m³, a volume resistivity of $1\times10^9$ Ωm, and an imaginary part of permeability at 400 MHz of 0.2.

Examples 8, 13, 18 and 19

The same procedure as defined in Example 7 was conducted except that composition and amount of soft-magnetic hexagonal ferrite particles, and average particle diameter, amount and BET specific surface area of barium carbonate particles, strontium carbonate particles or silicon dioxide particles were changed variously, thereby obtaining soft-magnetic hexagonal ferrite sintered ceramics.

Main production conditions and various properties of the obtained soft-magnetic hexagonal ferrite sintered ceramics are shown in Tables 1 to 6.

Examples 20 to 23, 25 to 26, 29 to 31 and 33 to 36, and Comparative Examples 8 to 10 and 14 to 16

The same procedure as defined in Example 2 was conducted except that composition of soft-magnetic hexagonal ferrite particles, average particle diameter, BET specific surface area and amount of barium carbonate particles, strontium carbonate particles, silicon dioxide particles, bismuth oxide particles and copper oxide particles, pressure used upon lamination of green sheets using soft-magnetic hexagonal ferrite composite particles, sintering temperature and sintering time were changed variously, thereby obtaining soft-magnetic hexagonal ferrite sintered ceramics.

Main production conditions and various properties of the obtained soft-magnetic hexagonal ferrite sintered ceramics are shown in Tables 7 to 14.

Meanwhile, in Comparative Example 16, the same procedure as defined in Comparative Example 14 was conducted except that the amount of bismuth oxide particles blended was changed to 0.5 part by weight, thereby obtaining a sintered ceramics. It was confirmed that the obtained sintered ceramics had a sintering density of $4.1 \times 10^3$ kg/m$^3$ and a volume resistivity of $1 \times 10^6$ Ωm, and that the real part ($\mu'$) of permeability was kept at about 1 over a frequency range up to 20 GHz (measurement limit), and the imaginary part ($\mu''$) of permeability was kept at about 0.

Comparative Example 17

α-Fe$_2$O$_3$, CoCO$_3$ and BaCO$_3$ were weighed such that the peak intensity of (1 0 13) plane of Y-type ferrite phase of a calcined product obtained therefrom was about 0.45 assuming that the peak intensity of (1 0 16) plane of Z-type ferrite phase was 1, and then mixed together in a stainless steel ball mill pot for 16 hours. The resultant mixture was filtrated and then dried. The obtained raw mixed particles were pre-calcined in atmospheric air at 1,250° C. for 2 hours, thereby obtaining soft-magnetic hexagonal ferrite containing a Z-type ferrite main phase. It was confirmed that assuming that the peak intensity of (1 0 16) plane of Z-type ferrite phase was 1, the peak intensity of (1 0 13) plane of Y-type ferrite phase was 0.46, and the peak intensity of (1 1 6) plane of W-type ferrite phase was 0. Then, 5.56 parts by weight of Bi$_2$O$_3$ and 5.56 parts by weight of CuO were added to the thus obtained soft-magnetic hexagonal ferrite, and the resultant mixture was pulverized for 90 hours in a plastic pot using ZrO$_2$ balls, thereby obtaining soft-magnetic hexagonal ferrite composite particles. It was confirmed that the obtained soft-magnetic hexagonal ferrite composite particles had an average particle diameter of 0.8 μm, a BET specific surface area of 13.8 m$^2$/g, a saturation magnetization of 37.8 Am$^2$/kg, and a coercive force of 12.1 kA/m. Then, the green sheet laminate was produced by the same method as defined in Example 2 except for using the above soft-magnetic hexagonal ferrite composite particles, and sintered in atmospheric air at 910° C. for 2 hours, thereby obtaining a soft-magnetic hexagonal ferrite sintered ceramics. It was confirmed that the obtained soft-magnetic hexagonal ferrite sintered ceramics had a density of $5.2 \times 10^3$ kg/m$^3$, a volume resistivity of $2 \times 10^5$ Ωm, a real part of permeability at 400 MHz of 3.7, and an imaginary part of permeability at 400 MHz of 0.21. Further, it was confirmed that the resonance frequency was 1.6 GHz, the imaginary part of permeability at the resonance frequency was 1.6, and the frequency at which the real part of permeability started to decrease was 0.69 GHz.

Example 24

The soft-magnetic hexagonal ferrite composite particles obtained by the same method as defined in Example 2, were filled in a metal mold, and press-molded under a pressure of $1 \times 10^4$ t/m$^2$, thereby obtaining a disk-shaped sample having a diameter of 30 mm and a thickness of 2.5 mm. The obtained disk-shaped sample was sintered in atmospheric air at 900° C. for 3 hours, thereby obtaining a soft-magnetic hexagonal ferrite sintered ceramics. It was confirmed that the thus obtained sintered ceramics had a sintering density of $5.1 \times 10^3$ kg/m$^3$, a volume resistivity of $7 \times 10^6$ Ωm, a real part of permeability at 400 MHz of 2.1, and an imaginary part of permeability at 400 MHz of 0.03. Further, it was confirmed that the resonance frequency was 5.4 GHz, the imaginary part of permeability at the resonance frequency was 1.0, and the frequency at which the real part of permeability started to decrease was 2.0 GHz.

Examples 27 to 28 and 32 and Comparative Examples 11 to 13

The same procedure as defined in Example 24 was conducted except that composition of soft-magnetic hexagonal ferrite particles, average particle diameter, BET specific surface area and amount of barium carbonate particles, strontium carbonate particles, silicon dioxide particles, bismuth oxide particles or copper oxide particles, pressure used upon molding, sintering temperature and sintering time were changed variously, thereby obtaining soft-magnetic hexagonal ferrite sintered ceramics.

Main production conditions and various properties of the obtained soft-magnetic hexagonal ferrite sintered ceramics are shown in Tables 7 to 14.

TABLE 1

Production of soft-magnetic hexagonal ferrite composite particles
Composition of soft-magnetic hexagonal ferrite particles (mol %)

| Examples | BaO | SrO | CoO | NiO | ZnO |
|---|---|---|---|---|---|
| Example 3 | 21.0 | — | 6.7 | 1.7 | — |
| Example 4 | 17.6 | — | 11.8 | — | — |
| Example 5 | 17.6 | — | 9.4 | — | 2.4 |
| Example 6 | 16.3 | — | 10.5 | — | — |
| Example 7 | 11.0 | 5.5 | 8.8 | — | — |
| Example 8 | 9.75 | 9.75 | 10.4 | — | — |
| Example 9 | 6.75 | 6.75 | — | 6.3 | 18.6 |
| Example 10 | 20.0 | — | — | 6.0 | 14.0 |
| Example 11 | 26.5 | — | — | 13.5 | — |
| Example 12 | 12.75 | 6.0 | — | 4.45 | 13.1 |
| Example 13 | 21.25 | — | — | 5.05 | 14.9 |
| Example 14 | 7.3 | — | 16.0 | 4.0 | — |
| Example 15 | 9.1 | — | 18.2 | — | — |
| Example 16 | 9.1 | — | 14.6 | — | 3.6 |
| Example 17 | 16.8 | — | 13.6 | — | — |
| Example 18 | 6.7 | 3.3 | 10.7 | — | — |
| Example 19 | 3.55 | 3.55 | 21.4 | — | — |

Production of soft-magnetic hexagonal ferrite composite particles
Composition of soft-magnetic hexagonal ferrite particles (mol %)

| Examples | CuO | MgO | MnO | Fe$_2$O$_3$ |
|---|---|---|---|---|
| Example 3 | — | — | — | 70.6 |
| Example 4 | — | — | — | 70.6 |
| Example 5 | — | — | — | 70.6 |
| Example 6 | 2.6 | — | — | 70.6 |
| Example 7 | — | 2.2 | — | 72.5 |
| Example 8 | — | — | 2.6 | 67.5 |
| Example 9 | 1.6 | — | — | 60.0 |

TABLE 1-continued

| Examples | | | | |
|---|---|---|---|---|
| Example 10 | — | — | — | 60.0 |
| Example 11 | — | — | — | 60.0 |
| Example 12 | — | 1.2 | — | 62.5 |
| Example 13 | — | — | 1.3 | 57.5 |
| Example 14 | — | — | — | 72.7 |
| Example 15 | — | — | — | 72.7 |
| Example 16 | — | — | — | 72.7 |
| Example 17 | 3.4 | — | — | 66.2 |
| Example 18 | — | 2.7 | — | 76.6 |
| Example 19 | — | — | 5.3 | 66.2 |

Production of soft-magnetic hexagonal ferrite composite particles
Blended materials
Barium carbonate particles

| Examples | Average particle diameter (μm) | Amount blended (wt. part) | BET specific surface area (m²/g) |
|---|---|---|---|
| Example 3 | 1.7 | 1.5 | 14.4 |
| Example 4 | 1.7 | 3.0 | 14.4 |
| Example 5 | 1.7 | 3.0 | 14.4 |
| Example 6 | 18.6 | 5.0 | 1.4 |
| Example 7 | 26.2 | 5.1 | 0.7 |
| Example 8 | 26.2 | 1.7 | 0.7 |
| Example 9 | 1.7 | 0.86 | 14.4 |
| Example 10 | 1.7 | 3.0 | 14.4 |
| Example 11 | 1.7 | 3.0 | 14.4 |
| Example 12 | 1.7 | 3.7 | 14.4 |
| Example 13 | 1.7 | 5.0 | 14.4 |
| Example 14 | 1.7 | 3.0 | 14.4 |
| Example 15 | 1.7 | 3.0 | 14.4 |
| Example 16 | 1.7 | 3.0 | 14.4 |
| Example 17 | 1.7 | 5.0 | 14.4 |
| Example 18 | 18.6 | 3.7 | 1.4 |
| Example 19 | 26.2 | 2.9 | 0.7 |

Production of soft-magnetic hexagonal ferrite composite particles
Blended materials
Strontium carbonate particles

| Examples | Average particle diameter (μm) | Amount blended (wt. part) | BET specific surface area (m²/g) |
|---|---|---|---|
| Example 3 | — | — | — |
| Example 4 | — | — | — |
| Example 5 | — | — | — |
| Example 6 | — | — | — |
| Example 7 | 2.1 | 1.9 | 10.3 |
| Example 8 | 2.1 | 1.3 | 10.3 |
| Example 9 | 16.9 | 0.6 | 2.0 |
| Example 10 | — | — | — |
| Example 11 | — | — | — |
| Example 12 | 2.1 | 1.3 | 10.3 |
| Example 13 | — | — | — |
| Example 14 | — | — | — |
| Example 15 | — | — | — |
| Example 16 | — | — | — |
| Example 17 | — | — | — |
| Example 18 | 2.1 | 1.3 | 10.3 |
| Example 19 | 29.1 | 2.1 | 0.6 |

Production of soft-magnetic hexagonal ferrite composite particles
Blended materials
Silicon dioxide particles

| Examples | Average particle diameter (μm) | Amount blended (wt. part) |
|---|---|---|
| Example 3 | 4.6 | 0.8 |
| Example 4 | 4.6 | 1.5 |
| Example 5 | 4.6 | 2.0 |
| Example 6 | 4.6 | 3.0 |
| Example 7 | 4.6 | 4.0 |
| Example 8 | 24.5 | 5.0 |
| Example 9 | 4.6 | 2.0 |
| Example 10 | 4.6 | 2.0 |
| Example 11 | 4.6 | 2.0 |
| Example 12 | 4.6 | 2.0 |
| Example 13 | 24.5 | 2.0 |
| Example 14 | 4.6 | 1.5 |
| Example 15 | 4.6 | 1.5 |
| Example 16 | 4.6 | 1.5 |
| Example 17 | 24.5 | 1.5 |
| Example 18 | 24.5 | 1.5 |
| Example 19 | 24.5 | 1.5 |

TABLE 2

Production of soft-magnetic hexagonal ferrite composite particles
Composition of soft-magnetic hexagonal ferrite particles (mol %)

| Comparative Examples | BaO | SrO | CoO | NiO | ZnO |
|---|---|---|---|---|---|
| Comparative Example 1 | 17.6 | — | 11.8 | — | — |
| Comparative Example 2 | 17.6 | — | 11.8 | — | — |
| Comparative Example 3 | 17.6 | — | 11.8 | — | — |
| Comparative Example 4 | 6.75 | 6.75 | — | 7.9 | 18.6 |
| Comparative Example 5 | 9.1 | — | 18.2 | — | — |
| Comparative Example 6 | 9.1 | — | 18.2 | — | — |
| Comparative Example 7 | — | — | — | 37.1 | 4.0 |

Production of soft-magnetic hexagonal ferrite composite particles
Composition of soft-magnetic hexagonal ferrite particles (mol %)

| Comparative Examples | CuO | MgO | MnO | Fe₂O₃ |
|---|---|---|---|---|
| Comparative Example 1 | — | — | — | 70.6 |
| Comparative Example 2 | — | — | — | 70.6 |
| Comparative Example 3 | — | — | — | 70.6 |
| Comparative Example 4 | — | — | — | 60.0 |
| Comparative Example 5 | — | — | — | 72.7 |
| Comparative Example 6 | — | — | — | 72.7 |
| Comparative Example 7 | 10.4 | — | — | 48.5 |

Production of soft-magnetic hexagonal ferrite composite particles
Blended materials
Barium carbonate particles

| Comparative Examples | Average particle diameter (μm) | Amount blended (wt. part) | BET specific surface area (m²/g) |
|---|---|---|---|
| Comparative Example 1 | 1.7 | 0.5 | 14.4 |
| Comparative Example 2 | 1.7 | 10.5 | 14.4 |
| Comparative Example 3 | 1.7 | 3.0 | 14.4 |
| Comparative Example 4 | 1.7 | 0.9 | 14.4 |
| Comparative Example 5 | 18.6 | 0.5 | 1.4 |
| Comparative Example 6 | 18.6 | 10.5 | 1.4 |
| Comparative Example 7 | — | — | — |

Production of soft-magnetic hexagonal ferrite composite particles
Blended materials
Strontium carbonate particles

| Comparative Examples | Average particle diameter (μm) | Amount blended (wt. part) | BET specific surface area (m²/g) |
|---|---|---|---|
| Comparative Example 1 | — | — | — |
| Comparative Example 2 | — | — | — |
| Comparative Example 3 | — | — | — |
| Comparative Example 4 | 16.9 | 0.6 | 2.0 |
| Comparative Example 5 | — | — | — |
| Comparative Example 6 | — | — | — |
| Comparative Example 7 | — | — | — |

TABLE 2-continued

Production of soft-magnetic hexagonal ferrite composite particles
Blended materials
Silicon dioxide particles

| Comparative Examples | Average particle diameter ($\mu$m) | Amount blended (wt. part) |
|---|---|---|
| Comparative Example 1 | 4.6 | 1.5 |
| Comparative Example 2 | 4.6 | 1.5 |
| Comparative Example 3 | 4.6 | 0.3 |
| Comparative Example 4 | 4.6 | 5.5 |
| Comparative Example 5 | 24.5 | 0.3 |
| Comparative Example 6 | 24.5 | 5.5 |
| Comparative Example 7 | — | — |

TABLE 3

Properties of soft-magnetic hexagonal ferrite composite particles
X-ray peak intensity ratio

| Examples | Z-type | Y-type | W-type |
|---|---|---|---|
| Example 3 | 1 | 0.58 | 0 |
| Example 4 | 1 | 0.52 | 0 |
| Example 5 | 1 | 0.45 | 0 |
| Example 6 | 1 | 0.39 | 0 |
| Example 7 | 1 | 0.41 | 0 |
| Example 8 | 1 | 0.33 | 0 |
| Example 9 | 0.38 | 1 | 0 |
| Example 10 | 0.37 | 1 | 0 |
| Example 11 | 0.41 | 1 | 0 |
| Example 12 | 0.41 | 1 | 0 |
| Example 13 | 0.40 | 1 | 0 |
| Example 14 | 0.32 | 0.21 | 1 |
| Example 15 | 0.31 | 0.20 | 1 |
| Example 16 | 0.41 | 0.16 | 1 |
| Example 17 | 0.43 | 0.16 | 1 |
| Example 18 | 0.49 | 0.11 | 1 |
| Example 19 | 0.53 | 0.10 | 1 |

Properties of soft-magnetic hexagonal ferrite composite particles

| Examples | Saturation magnetization (Am$^2$/kg) | Coercive force (kA/m) |
|---|---|---|
| Example 3 | 40.3 | 11.9 |
| Example 4 | 41.8 | 10.5 |
| Example 5 | 42.9 | 8.4 |
| Example 6 | 42.3 | 7.8 |
| Example 7 | 42.1 | 8.0 |
| Example 8 | 41.5 | 7.6 |
| Example 9 | 32.3 | 11.7 |
| Example 10 | 33.7 | 10.1 |
| Example 11 | 31.4 | 9.9 |
| Example 12 | 31.1 | 10.6 |
| Example 13 | 31.5 | 12.5 |
| Example 14 | 37.1 | 12.8 |
| Example 15 | 36.8 | 12.4 |
| Example 16 | 38.1 | 8.1 |
| Example 17 | 37.8 | 8.0 |
| Example 18 | 35.8 | 6.3 |
| Example 19 | 36.2 | 6.8 |

Properties of soft-magnetic hexagonal ferrite composite particles

| Examples | BET specific surface area (m$^2$/g) | Average particle diameter ($\mu$m) |
|---|---|---|
| Example 3 | 3.3 | 2.9 |
| Example 4 | 3.2 | 3.1 |
| Example 5 | 2.7 | 3.6 |
| Example 6 | 1.4 | 6.9 |
| Example 7 | 1.2 | 7.4 |
| Example 8 | 0.7 | 18.7 |
| Example 9 | 6.8 | 2.5 |
| Example 10 | 7.1 | 2.3 |
| Example 11 | 1.3 | 7.1 |
| Example 12 | 1.2 | 7.7 |
| Example 13 | 0.8 | 17.7 |
| Example 14 | 14.5 | 0.6 |
| Example 15 | 13.1 | 1.0 |
| Example 16 | 3.3 | 3.0 |
| Example 17 | 3.0 | 3.3 |
| Example 18 | 1.3 | 7.3 |
| Example 19 | 1.1 | 7.5 |

TABLE 4

Properties of soft-magnetic hexagonal ferrite composite particles
X-ray peak intensity ratio

| Comparative Examples | Z-type | Y-type | W-type |
|---|---|---|---|
| Comparative Example 1 | 1 | 0.52 | 0 |
| Comparative Example 2 | 1 | 0.52 | 0 |
| Comparative Example 3 | 1 | 0.52 | 0 |
| Comparative Example 4 | 0.27 | 1 | 0 |
| Comparative Example 5 | 0.31 | 0.20 | 1 |
| Comparative Example 6 | 0.31 | 0.20 | 1 |
| Comparative Example 7 | Cubic spinel ferrite single crystal phase | | |

Properties of soft-magnetic hexagonal ferrite composite particles

| Comparative Examples | Saturation magnetization (Am$^2$/kg) | Coercive force (kA/m) |
|---|---|---|
| Comparative Example 1 | 41.8 | 10.5 |
| Comparative Example 2 | 41.8 | 10.5 |
| Comparative Example 3 | 41.8 | 10.5 |
| Comparative Example 4 | 34.1 | 8.8 |
| Comparative Example 5 | 36.8 | 12.4 |
| comparative Example 6 | 36.8 | 12.4 |
| Comparative Example 7 | 51.9 | 4.5 |

Properties of soft-magnetic hexagonal ferrite composite particles

| Comparative Examples | BET specific surface area (m$^2$/g) | Average particle diameter ($\mu$m) |
|---|---|---|
| Comparative Example 1 | 3.2 | 2.1 |
| Comparative Example 2 | 3.2 | 2.1 |
| Comparative Example 3 | 3.2 | 2.1 |
| Comparative Example 4 | 6.4 | 2.7 |
| Comparative Example 5 | 13.1 | 1.0 |
| Comparative Example 6 | 13.1 | 1.0 |
| Comparative Example 7 | 3.6 | 0.9 |

TABLE 5

| | Molding | |
|---|---|---|
| Examples | Method | Pressure (t/m$^2$) |
| Example 3 | Green sheet method | $0.5 \times 10^4$ |
| Example 4 | Green sheet method | $0.5 \times 10^4$ |
| Example 5 | Green sheet method | $1 \times 10^4$ |
| Example 6 | Green sheet method | $1 \times 10^4$ |
| Example 7 | Particle pressure-molding method | $1 \times 10^4$ |
| Example 8 | Particle pressure-molding method | $1 \times 10^4$ |
| Example 9 | Green sheet method | $0.5 \times 10^4$ |
| Example 10 | Green sheet method | $0.5 \times 10^4$ |
| Example 11 | Green sheet method | $0.8 \times 10^4$ |
| Example 12 | Green sheet method | $0.8 \times 10^4$ |
| Example 13 | Particle pressure-molding method | $0.8 \times 10^4$ |

TABLE 5-continued

| Examples | Molding Method | Pressure (t/m²) |
|---|---|---|
| Example 14 | Green sheet method | $2 \times 10^4$ |
| Example 15 | Green sheet method | $2 \times 10^4$ |
| Example 16 | Green sheet method | $3 \times 10^4$ |
| Example 17 | Green sheet method | $3 \times 10^4$ |
| Example 18 | Particle pressure-molding method | $0.5 \times 10^4$ |
| Example 19 | Particle pressure-molding method | $0.5 \times 10^4$ |

| Examples | Sintering Temp. (°C.) | Time (hr) | Sintering density (kg/m³) | Volume resistivity (Ωm) |
|---|---|---|---|---|
| Example 3 | 1,200 | 5 | $5.1 \times 10^3$ | $8 \times 10^7$ |
| Example 4 | 1,225 | 5 | $5.1 \times 10^3$ | $5 \times 10^8$ |
| Example 5 | 1,250 | 5 | $5.3 \times 10^3$ | $2 \times 10^8$ |
| Example 6 | 1,250 | 5 | $5.2 \times 10^3$ | $6 \times 10^8$ |
| Example 7 | 1,250 | 3 | $5.2 \times 10^3$ | $1 \times 10^9$ |
| Example 8 | 1,275 | 3 | $5.1 \times 10^3$ | $3 \times 10^7$ |
| Example 9 | 1,200 | 3 | $5.1 \times 10^3$ | $4 \times 10^8$ |
| Example 10 | 1,225 | 3 | $5.1 \times 10^3$ | $8 \times 10^8$ |
| Example 11 | 1,225 | 3 | $5.3 \times 10^3$ | $1 \times 10^9$ |
| Example 12 | 1,225 | 5 | $5.2 \times 10^3$ | $1 \times 10^8$ |
| Example 13 | 1,200 | 5 | $5.2 \times 10^3$ | $6 \times 10^8$ |
| Example 14 | 1,225 | 7 | $5.2 \times 10^3$ | $1 \times 10^9$ |
| Example 15 | 1,225 | 7 | $5.1 \times 10^3$ | $8 \times 10^8$ |
| Example 16 | 1,250 | 7 | $5.1 \times 10^3$ | $4 \times 10^8$ |
| Example 17 | 1,250 | 7 | $5.3 \times 10^3$ | $1 \times 10^8$ |
| Example 18 | 1,275 | 10 | $5.2 \times 10^3$ | $2 \times 10^7$ |
| Example 19 | 1,275 | 10 | $5.2 \times 10^3$ | $8 \times 10^6$ |

Properties of soft-magnetic hexagonal ferrite sintered ceramics

| Examples | Real part of magnetic permeability at 400 MHz | Imaginary part of magnetic permeability at 400 MHz | Resonance frequency (GHz) |
|---|---|---|---|
| Example 3 | 8.6 | 0.7 | 1.4 |
| Example 4 | 5.9 | 0.3 | 1.9 |
| Example 5 | 5.5 | 0.3 | 2.1 |
| Example 6 | 4.9 | 0.2 | 2.4 |
| Example 7 | 4.6 | 0.2 | 2.5 |
| Example 8 | 4.2 | 0.1 | 2.6 |
| Example 9 | 4.9 | 0.2 | 2.4 |
| Example 10 | 5.1 | 0.2 | 2.3 |
| Example 11 | 5.3 | 0.4 | 2.2 |
| Example 12 | 5.2 | 0.3 | 2.2 |
| Example 13 | 4.8 | 0.2 | 2.5 |
| Example 14 | 4.3 | 0.2 | 2.6 |
| Example 15 | 4.1 | 0.2 | 2.7 |
| Example 16 | 5.7 | 0.2 | 2.0 |
| Example 17 | 3.8 | 0.1 | 2.7 |
| Example 18 | 3.7 | 0.1 | 2.8 |
| Example 19 | 4.3 | 0.2 | 2.6 |

Properties of soft-magnetic hexagonal ferrite sintered ceramics

| Examples | Imaginary part of permeability at resonance frequency | Frequency at which reduction in real part of permeability is started (MHz) |
|---|---|---|
| Example 3 | 5.8 | 755 |
| Example 4 | 3.9 | 906 |
| Example 5 | 3.5 | 935 |
| Example 6 | 2.9 | 981 |
| Example 7 | 2.6 | 1,068 |
| Example 8 | 2.2 | 1,172 |
| Example 9 | 2.9 | 983 |
| Example 10 | 3.1 | 965 |
| Example 11 | 3.3 | 949 |
| Example 12 | 3.2 | 960 |
| Example 13 | 2.8 | 989 |
| Example 14 | 2.4 | 1,143 |
| Example 15 | 2.0 | 1,185 |
| Example 16 | 3.7 | 918 |
| Example 17 | 1.9 | 1,276 |
| Example 18 | 1.8 | 1,323 |
| Example 19 | 2.4 | 1,156 |

TABLE 6

| Comparative Examples | Molding Method | Pressure (t/m²) |
|---|---|---|
| Comparative Example 1 | Green sheet method | $0.5 \times 10^4$ |
| Comparative Example 2 | Green sheet method | $0.8 \times 10^4$ |
| Comparative Example 3 | Green sheet method | $0.8 \times 10^4$ |
| Comparative Example 4 | Green sheet method | $0.8 \times 10^4$ |
| Comparative Example 5 | Green sheet method | $1 \times 10^4$ |
| Comparative Example 6 | Green sheet method | $1 \times 10^4$ |
| Comparative Example 7 | Green sheet method | $1 \times 10^4$ |

Properties of soft-magnetic hexagonal ferrite sintered ceramics

| Comparative Examples | Sintering Temp. (°C.) | Time (hr) | Sintering density (kg/m³) | Volume resistivity (Ωm) |
|---|---|---|---|---|
| Comparative Example 1 | 1,250 | 3 | $4.8 \times 10^3$ | $8 \times 10^7$ |
| Comparative Example 2 | 1,225 | 3 | $4.9 \times 10^3$ | $2 \times 10^7$ |
| Comparative Example 3 | 1,250 | 3 | $5.2 \times 10^3$ | $6 \times 10^5$ |
| Comparative Example 4 | 1,250 | 4 | $4.7 \times 10^2$ | $2 \times 10^8$ |
| Comparative Example 5 | 1,225 | 4 | $4.7 \times 10^3$ | $8 \times 10^5$ |
| Comparative Example 6 | 1,250 | 5 | $4.8 \times 10^3$ | $7 \times 10^7$ |
| Comparative Example 7 | 900 | 3 | $5.2 \times 10^3$ | $3 \times 10^7$ |

Properties of soft-magnetic hexagonal ferrite sintered ceramics

| Comparative Examples | Real part of permeability at 400 MHz | Imaginary part of permeability at 400 MHz | Resonance frequency (GHz) |
|---|---|---|---|
| Comparative Example 1 | 4.9 | 0.2 | 2.4 |
| Comparative Example 2 | 4.8 | 0.1 | 2.5 |
| Comparative Example 3 | 10.2 | 3.1 | 0.92 |
| Comparative Example 4 | 3.8 | 0.1 | 2.7 |
| Comparative Example 5 | 8.2 | 1.1 | 1.3 |
| Comparative Example 6 | 2.9 | 0.1 | 3.7 |
| Comparative Example 7 | 9.4 | 13.8 | 0.11 |

Properties of soft-magnetic hexagonal ferrite sintered ceramics

| Comparative Examples | Imaginary part of permeability at resonance frequency | Frequency at which reduction in real part of permeability is started (MHz) |
|---|---|---|
| Comparative Example 1 | 2.9 | 985 |
| Comparative Example 2 | 2.7 | 996 |
| Comparative Example 3 | 6.2 | 320 |
| Comparative Example 4 | 1.9 | 1,282 |
| Comparative Example 5 | 4.2 | 642 |
| Comparative Example 6 | 1.4 | 1,584 |
| Comparative Example 7 | 21.0 | 48 |

TABLE 7

| Examples | Composition of soft-magnetic hexagonal ferrite particles (mol %) | | | | |
|---|---|---|---|---|---|
| | BaO | SrO | CoO | NiO | ZnO |
| Example 2 | 18.6 | — | 11.6 | — | — |
| Example 20 | 21.0 | — | 6.6 | 1.8 | — |
| Example 21 | 17.5 | — | 11.9 | — | — |
| Example 22 | 17.5 | — | 9.5 | — | 2.4 |
| Example 23 | 16.5 | — | 10.5 | — | — |
| Example 24 | 11.0 | 5.5 | 8.8 | — | — |
| Example 25 | 9.72 | 9.78 | 10.5 | — | — |
| Example 26 | 6.76 | 6.74 | — | 6.3 | 18.6 |
| Example 27 | 20.0 | — | — | 6.0 | 14.1 |
| Example 28 | 26.5 | — | — | 13.5 | — |
| Example 29 | 12.71 | 5.9 | — | 4.49 | 12.9 |
| Example 30 | 21.11 | — | — | 5.19 | 14.8 |
| Example 31 | 7.2 | — | 15.8 | 4.3 | — |
| Example 32 | 9.2 | — | 18.3 | — | — |
| Example 33 | 9.2 | — | 14.6 | — | 3.5 |
| Example 34 | 12.8 | — | 13.5 | — | — |
| Example 35 | 6.7 | 3.4 | 10.6 | — | — |
| Example 36 | 3.48 | 3.62 | 21.3 | — | — |

| Examples | Composition of soft-magnetic hexagonal ferrite particles (mol %) | | | |
|---|---|---|---|---|
| | CuO | MgO | MnO | Fe$_2$O$_3$ |
| Example 2 | — | — | — | 69.8 |
| Example 20 | — | — | — | 70.6 |
| Example 21 | — | — | — | 70.6 |
| Example 22 | — | — | — | 70.6 |
| Example 23 | 2.5 | — | — | 70.5 |
| Example 24 | — | 2.2 | — | 72.5 |
| Example 25 | — | — | 2.5 | 67.5 |
| Example 26 | 1.6 | — | — | 60.0 |
| Example 27 | — | — | — | 59.9 |
| Example 28 | — | — | — | 60.0 |
| Example 29 | — | 1.5 | — | 62.5 |
| Example 30 | — | — | 1.5 | 57.4 |
| Example 31 | — | — | — | 72.7 |
| Example 32 | — | — | — | 72.5 |
| Example 33 | — | — | — | 72.7 |
| Example 34 | 3.5 | — | — | 70.2 |
| Example 35 | — | 2.7 | — | 76.6 |
| Example 36 | — | — | 5.3 | 66.3 |

TABLE 8

| Comparative Examples | Composition of soft-magnetic hexagonal ferrite particles (mol %) | | | | |
|---|---|---|---|---|---|
| | BaO | SrO | CoO | NiO | ZnO |
| Comparative Example 8 | 17.5 | — | 12.0 | — | — |
| Comparative Example 9 | 17.5 | — | 12.0 | — | — |
| Comparative Example 10 | 17.5 | — | 12.0 | — | — |
| Comparative Example 11 | 6.69 | 6.81 | — | 7.7 | 18.7 |
| Comparative Example 12 | 9.2 | — | 18.3 | — | — |
| Comparative Example 13 | 9.2 | — | 18.3 | — | — |
| Comparative Example 14 | 17.5 | — | 11.9 | — | — |
| Comparative Example 15 | 17.5 | — | 11.9 | — | — |

| Comparative Examples | Composition of soft-magnetic hexagonal ferrite particles (mol %) | | | |
|---|---|---|---|---|
| | CuO | MgO | MnO | Fe$_2$O$_3$ |
| Comparative Example 8 | — | — | — | 70.5 |
| Comparative Example 9 | — | — | — | 70.5 |
| Comparative Example 10 | — | — | — | 70.5 |
| Comparative Example 11 | — | — | — | 60.1 |
| Comparative Example 12 | — | — | — | 72.5 |
| Comparative Example 13 | — | — | — | 72.5 |
| Comparative Example 14 | — | — | — | 70.6 |
| Comparative Example 15 | — | — | — | 70.6 |

TABLE 9

| Examples | Additives added after calcination Barium carbonate particles | | |
|---|---|---|---|
| | Average particle diameter ($\mu$m) | BET specific surface area (m$^2$/g) | Amount added (wt. part) |
| Example 2 | 1.8 | 14.0 | 2.0 |
| Example 20 | 1.8 | 14.0 | 0.5 |
| Example 21 | 1.8 | 14.0 | 1.0 |
| Example 22 | 1.8 | 14.0 | 2.0 |
| Example 23 | 1.8 | 14.0 | 3.0 |
| Example 24 | 19.4 | 1.3 | 2.9 |
| Example 25 | 19.4 | 1.3 | 2.8 |
| Example 26 | 19.4 | 1.3 | 0.60 |
| Example 27 | 25.1 | 0.8 | 1.0 |
| Example 28 | 25.1 | 0.8 | 1.0 |
| Example 29 | 25.1 | 0.8 | 1.5 |
| Example 30 | 1.8 | 14.0 | 2.0 |
| Example 31 | 1.8 | 14.0 | 2.0 |
| Example 32 | 1.8 | 14.0 | 2.0 |
| Example 33 | 1.8 | 14.0 | 3.0 |
| Example 34 | 1.8 | 14.0 | 3.0 |
| Example 35 | 1.8 | 14.0 | 2.2 |
| Example 36 | 1.8 | 14.0 | 2.6 |

| Examples | Additives added after calcination Strontium carbonate particles | | |
|---|---|---|---|
| | Average particle diameter ($\mu$m) | BET specific surface area (m$^2$/g) | Amount added (wt. part) |
| Example 2 | — | — | — |
| Example 20 | — | — | — |
| Example 21 | — | — | — |
| Example 22 | — | — | — |
| Example 23 | — | — | — |
| Example 24 | 2.5 | 9.4 | 1.1 |
| Example 25 | 2.5 | 9.4 | 2.2 |
| Example 26 | 15.2 | 2.1 | 0.4 |
| Example 27 | — | — | — |
| Example 28 | — | — | — |
| Example 29 | 2.5 | 9.4 | 0.5 |
| Example 30 | — | — | — |
| Example 31 | — | — | — |
| Example 32 | — | — | — |
| Example 33 | — | — | — |
| Example 34 | — | — | — |
| Example 35 | 2.5 | 9.4 | 0.8 |
| Example 36 | 29.4 | 0.6 | 0.4 |

| Examples | Additives added after calcination Silicon dioxide particles | |
|---|---|---|
| | Average particle diameter ($\mu$m) | Amount added (wt. part) |
| Example 2 | 15.8 | 1.0 |
| Example 20 | 4.2 | 0.1 |
| Example 21 | 4.2 | 0.3 |
| Example 22 | 4.2 | 0.5 |
| Example 23 | 4.2 | 1.0 |
| Example 24 | 4.6 | 2.0 |
| Example 25 | 15.8 | 4.0 |
| Example 26 | 15.8 | 0.3 |
| Example 27 | 15.8 | 0.3 |
| Example 28 | 27.6 | 0.5 |
| Example 29 | 27.6 | 0.5 |
| Example 30 | 27.6 | 0.7 |
| Example 31 | 27.6 | 1.0 |
| Example 32 | 27.6 | 1.0 |
| Example 33 | 27.6 | 1.0 |
| Example 34 | 27.6 | 1.5 |

TABLE 9-continued

| Examples | | |
|---|---|---|
| Example 35 | 4.2 | 2.0 |
| Example 36 | 4.2 | 2.0 |

Additives added after calcination
Bismuth oxide particles

| Examples | Average particle diameter (μm) | BET specific surface area (m²/g) | Amount added (wt. part) |
|---|---|---|---|
| Example 2 | 3.8 | 0.7 | 8 |
| Example 20 | 0.7 | 12.3 | 2 |
| Example 21 | 0.7 | 12.3 | 6 |
| Example 22 | 0.7 | 12.3 | 6 |
| Example 23 | 3.8 | 0.7 | 9 |
| Example 24 | 3.8 | 0.7 | 9 |
| Example 25 | 3.8 | 0.7 | 17 |
| Example 26 | 3.8 | 0.7 | 4 |
| Example 27 | 3.8 | 0.7 | 4 |
| Example 28 | 3.8 | 0.7 | 4 |
| Example 29 | 11.2 | 0.5 | 6 |
| Example 30 | 11.2 | 0.5 | 6 |
| Example 31 | 11.2 | 0.5 | 6 |
| Example 32 | 17.4 | 0.3 | 9 |
| Example 33 | 17.4 | 0.3 | 9 |
| Example 34 | 0.7 | 12.3 | 9 |
| Example 35 | 0.7 | 12.3 | 9 |
| Example 36 | 0.7 | 12.3 | 12 |

Additives added after calcination
Copper oxide particles

| Examples | Average particle diameter (μm) | BET specific surface area (m²/g) | Amount added (wt. part) |
|---|---|---|---|
| Example 2 | 1.3 | 3.7 | 3 |
| Example 20 | 0.4 | 15.4 | 0.5 |
| Example 21 | 0.4 | 15.4 | 1 |
| Example 22 | 0.4 | 15.4 | 1 |
| Example 23 | 0.4 | 15.4 | 3 |
| Example 24 | 1.3 | 3.7 | 3 |
| Example 25 | 1.3 | 3.7 | 5 |
| Example 26 | 1.3 | 3.7 | 1 |
| Example 27 | 1.3 | 3.7 | 2 |
| Example 28 | 1.3 | 3.7 | 1 |
| Example 29 | 1.3 | 3.7 | 2 |
| Example 30 | 7.2 | 0.5 | 3 |
| Example 31 | 7.2 | 0.5 | 2 |
| Example 32 | 7.2 | 0.5 | 2 |
| Example 33 | 7.2 | 0.5 | 3 |
| Example 34 | 16.2 | 0.2 | 3 |
| Example 35 | 16.2 | 0.2 | 4 |
| Example 36 | 16.2 | 0.2 | 3 |

TABLE 10

Additives added after calcination
Barium carbonate particles

| Comparative Examples | Average particle diameter (μm) | BET specific surface area (m²/g) | Amount added (wt. part) |
|---|---|---|---|
| Comparative Example 8 | 1.8 | 14.0 | 0.2 |
| Comparative Example 9 | 1.8 | 14.0 | 8.0 |
| Comparative Example 10 | 1.8 | 14.0 | 1.5 |
| Comparative Example 11 | 1.8 | 14.0 | 0.9 |
| Comparative Example 12 | 1.8 | 14.0 | 2.0 |
| Comparative Example 13 | 19.4 | 1.3 | 2.0 |
| Comparative Example 14 | 19.4 | 1.3 | 1.0 |
| Comparative Example 15 | 19.4 | 1.3 | 1.0 |
| Comparative Example 17 | — | — | — |

Additives added after calcination
Strontium carbonate particles

| Comparative Examples | Average particle diameter (μm) | BET specific surface area (m²/g) | Amount added (wt. part) |
|---|---|---|---|
| Comparative Example 8 | — | — | — |
| Comparative Example 9 | — | — | — |
| Comparative Example 10 | — | — | — |
| Comparative Example 11 | 15.2 | 2.1 | 0.6 |
| Comparative Example 12 | — | — | — |
| Comparative Example 13 | — | — | — |
| Comparative Example 14 | — | — | — |
| Comparative Example 15 | — | — | — |
| Comparative Example 17 | — | — | — |

Additives added after calcination
Silicon dioxide particles

| Comparative Examples | Average particle diameter (μm) | Amount added (wt. part) |
|---|---|---|
| Comparative Example 8 | 4.2 | 0.8 |
| Comparative Example 9 | 4.2 | 0.8 |
| Comparative Example 10 | 15.8 | 0.05 |
| Comparative Example 11 | 15.8 | 6.0 |
| Comparative Example 12 | 27.6 | 1.2 |
| Comparative Example 13 | 27.6 | 1.2 |
| Comparative Example 14 | 27.6 | 1.5 |
| Comparative Example 15 | 27.6 | 1.5 |
| Comparative Example 17 | — | — |

Additives added after calcination
Bismuth oxide particles

| Comparative Examples | Average particle diameter (μm) | BET specific surface area (m²/g) | Amount added (wt. part) |
|---|---|---|---|
| Comparative Example 8 | 3.8 | 0.7 | 9 |
| Comparative Example 9 | 3.8 | 0.7 | 9 |
| Comparative Example 10 | 3.8 | 0.7 | 6 |

TABLE 10-continued

| Comparative Examples | | | |
|---|---|---|---|
| Comparative Example 11 | 3.8 | 0.7 | 6 |
| Comparative Example 12 | 11.2 | 0.5 | 0.5 |
| Comparative Example 13 | 11.2 | 0.5 | 21 |
| Comparative Example 14 | 11.2 | 0.5 | 9 |
| Comparative Example 15 | 11.2 | 0.5 | 9 |
| Comparative Example 17 | 2.4 | 7.2 | 5.56 |

| | Additives added after calcination Copper oxide particles | | |
|---|---|---|---|
| Comparative Examples | Average particle diameter ($\mu$m) | BET specific surface area (m$^2$/g) | Amount added (wt. part) |
| Comparative Example 8 | 1.3 | 3.7 | 2 |
| Comparative Example 9 | 1.3 | 3.7 | 2 |
| Comparative Example 10 | 1.3 | 3.7 | 1 |
| Comparative Example 11 | 1.3 | 3.7 | 1 |
| Comparative Example 12 | 1.3 | 3.7 | 3 |
| Comparative Example 13 | 7.2 | 0.5 | 3 |
| Comparative Example 14 | 7.2 | 0.5 | 0.2 |
| Comparative Example 15 | 7.2 | 0.5 | 8 |
| Comparative Example 17 | 1.0 | 6.7 | 5.56 |

TABLE 11

| | Properties of soft-magnetic hexagonal ferrite composite particles X-ray peak intensity ratio | | |
|---|---|---|---|
| Examples | Z-type | Y-type | W-type |
| Example 2 | 1 | 0.55 | 0 |
| Example 20 | 1 | 0.57 | 0 |
| Example 21 | 1 | 0.54 | 0 |
| Example 22 | 1 | 0.47 | 0 |
| Example 23 | 1 | 0.37 | 0 |
| Example 24 | 1 | 0.43 | 0 |
| Example 25 | 1 | 0.33 | 0 |
| Example 26 | 0.35 | 1 | 0 |
| Example 27 | 0.37 | 1 | 0 |
| Example 28 | 0.42 | 1 | 0 |
| Example 29 | 0.42 | 1 | 0 |
| Example 30 | 0.40 | 1 | 0 |
| Example 31 | 0.32 | 0.22 | 1 |
| Example 32 | 0.30 | 0.20 | 1 |
| Example 33 | 0.41 | 0.17 | 1 |
| Example 34 | 0.44 | 0.15 | 1 |
| Example 35 | 0.51 | 0.08 | 1 |
| Example 36 | 0.50 | 0.09 | 1 |

| | Properties of soft-magnetic hexagonal ferrite composite particles | |
|---|---|---|
| Examples | Saturation magnetization (Am$^2$/kg) | Coercive force (kA/m) |
| Example 2 | 35.2 | 14.7 |
| Example 20 | 38.7 | 15.1 |

TABLE 11-continued

| Example 21 | 39.2 | 13.4 |
|---|---|---|
| Example 22 | 39.1 | 11.8 |
| Example 23 | 37.5 | 10.8 |
| Example 24 | 35.1 | 11.0 |
| Example 25 | 32.5 | 10.9 |
| Example 26 | 31.0 | 15.1 |
| Example 27 | 32.3 | 13.5 |
| Example 28 | 29.9 | 13.1 |
| Example 29 | 28.7 | 14.1 |
| Example 30 | 29.6 | 16.1 |
| Example 31 | 34.1 | 15.7 |
| Example 32 | 32.6 | 15.8 |
| Example 33 | 34.2 | 11.7 |
| Example 34 | 32.5 | 10.9 |
| Example 35 | 29.9 | 9.6 |
| Example 36 | 29.2 | 10.1 |

| | Properties of soft-magnetic hexagonal ferrite composite particles | |
|---|---|---|
| Examples | BET specific surface area (m$^2$/g) | Average particle diameter ($\mu$m) |
| Example 2 | 6.2 | 1.2 |
| Example 20 | 1.9 | 3.3 |
| Example 21 | 0.8 | 18.3 |
| Example 22 | 5.4 | 2.4 |
| Example 23 | 3.5 | 2.8 |
| Example 24 | 7.2 | 1.9 |
| Example 25 | 14.8 | 0.7 |
| Example 26 | 1.5 | 3.8 |
| Example 27 | 2.1 | 3.2 |
| Example 28 | 5.4 | 2.2 |
| Example 29 | 7.8 | 1.8 |
| Example 30 | 9.8 | 1.4 |
| Example 31 | 1.2 | 4.1 |
| Example 32 | 3.7 | 2.6 |
| Example 33 | 4.4 | 2.4 |
| Example 34 | 6.1 | 2.0 |
| Example 35 | 7.9 | 1.6 |
| Example 36 | 8.3 | 1.5 |

TABLE 12

| | Properties of soft-magnetic hexagonal ferrite composite particles X-ray peak intensity ratio | | |
|---|---|---|---|
| Comparative Examples | Z-type | Y-type | W-type |
| Comparative Example 8 | 1 | 0.51 | 0 |
| Comparative Example 9 | 1 | 0.51 | 0 |
| Comparative Example 10 | 1 | 0.51 | 0 |
| Comparative Example 11 | 0.27 | 1 | 0 |
| Comparative Example 12 | 0.30 | 0.20 | 1 |
| Comparative Example 13 | 0.30 | 0.20 | 1 |
| Comparative Example 14 | 1 | 0.54 | 0 |
| Comparative Example 15 | 1 | 0.54 | 0 |
| Comparative Example 16 | 1 | 0.54 | 0 |
| Comparative Example 17 | 1 | 0.46 | 0 |

TABLE 12-continued

| Comparative Examples | Properties of soft-magnetic hexagonal ferrite composite particles | |
|---|---|---|
| | Saturation magnetization ($Am^2/kg$) | Coercive force (kA/m) |
| Comparative Example 8 | 36.5 | 13.8 |
| Comparative Example 9 | 34.4 | 12.4 |
| Comparative Example 10 | 37.5 | 13.1 |
| Comparative Example 11 | 27.5 | 11.7 |
| Comparative Example 12 | 34.0 | 16.0 |
| Comparative Example 13 | 28.7 | 16.2 |
| Comparative Example 14 | 36.5 | 13.6 |
| Comparative Example 15 | 33.2 | 14.2 |
| Comparative Example 16 | 37.8 | 13.5 |
| Comparative Example 17 | 37.8 | 12.1 |

| Comparative Examples | Properties of soft-magnetic hexagonal ferrite composite particles | |
|---|---|---|
| | BET specific surface area ($m^2/g$) | Average particle diameter ($\mu m$) |
| Comparative Example 8 | 4.1 | 2.3 |
| Comparative Example 9 | 4.0 | 2.3 |
| Comparative Example 10 | 5.3 | 1.9 |
| Comparative Example 11 | 5.5 | 1.9 |
| Comparative Example 12 | 8.1 | 1.7 |
| Comparative Example 13 | 8.5 | 1.5 |
| Comparative Example 14 | 10.8 | 1.2 |
| Comparative Example 15 | 11.3 | 1.1 |
| Comparative Example 16 | 10.7 | 1.3 |
| Comparative Example 17 | 13.8 | 0.8 |

TABLE 13

| Examples | Molding Method | Pressure ($t/m^2$) |
|---|---|---|
| Example 2 | Green sheet method | $0.5 \times 10^4$ |
| Example 20 | Green sheet method | $0.5 \times 10^4$ |
| Example 21 | Green sheet method | $0.5 \times 10^4$ |
| Example 22 | Green sheet method | $0.5 \times 10^4$ |
| Example 23 | Green sheet method | $0.8 \times 10^4$ |
| Example 24 | Particle pressure-molding method | $1 \times 10^4$ |
| Example 25 | Green sheet method | $3 \times 10^4$ |
| Example 26 | Green sheet method | $0.5 \times 10^4$ |
| Example 27 | Particle pressure-molding method | $0.5 \times 10^4$ |
| Example 28 | Particle pressure-molding method | $0.5 \times 10^4$ |
| Example 29 | Green sheet method | $0.8 \times 10^4$ |
| Example 30 | Green sheet method | $0.8 \times 10^4$ |
| Example 31 | Green sheet method | $0.8 \times 10^4$ |
| Example 32 | Particle pressure-molding method | $3 \times 10^4$ |
| Example 33 | Green sheet method | $2 \times 10^4$ |
| Example 34 | Green sheet method | $2 \times 10^4$ |
| Example 35 | Green sheet method | $0.5 \times 10^4$ |
| Example 36 | Green sheet method | $0.5 \times 10^4$ |

| Examples | Properties of soft-magnetic hexagonal ferrite sintered ceramics | | | |
|---|---|---|---|---|
| | Sintering Temp. (°C.) | Sintering Time (hr) | density ($kg/m^3$) | Volume resistivity ($\Omega m$) |
| Example 2 | 900 | 3 | $5.1 \times 10^3$ | $5 \times 10^6$ |
| Example 20 | 900 | 2 | $5.0 \times 10^3$ | $2 \times 10^6$ |
| Example 21 | 900 | 2 | $5.0 \times 10^3$ | $3 \times 10^6$ |
| Example 22 | 900 | 2 | $5.2 \times 10^3$ | $2 \times 10^6$ |
| Example 23 | 900 | 2 | $5.0 \times 10^3$ | $6 \times 10^6$ |
| Example 24 | 900 | 3 | $5.1 \times 10^3$ | $7 \times 10^6$ |
| Example 25 | 925 | 3 | $5.0 \times 10^3$ | $1 \times 10^7$ |
| Example 26 | 900 | 3 | $5.1 \times 10^3$ | $2 \times 10^6$ |
| Example 27 | 900 | 3 | $5.0 \times 10^3$ | $4 \times 10^6$ |
| Example 28 | 900 | 3 | $5.0 \times 10^3$ | $2 \times 10^6$ |
| Example 29 | 825 | 5 | $5.0 \times 10^3$ | $6 \times 10^6$ |
| Example 30 | 850 | 5 | $5.0 \times 10^3$ | $3 \times 10^6$ |
| Example 31 | 875 | 7 | $5.1 \times 10^3$ | $4 \times 10^6$ |
| Example 32 | 900 | 3 | $5.1 \times 10^3$ | $2 \times 10^6$ |
| Example 33 | 900 | 3 | $5.0 \times 10^3$ | $4 \times 10^6$ |
| Example 34 | 925 | 1 | $5.0 \times 10^3$ | $3 \times 10^6$ |
| Example 35 | 925 | 10 | $5.1 \times 10^3$ | $5 \times 10^6$ |
| Example 36 | 925 | 10 | $5.0 \times 10^3$ | $7 \times 10^6$ |

| Examples | Properties of soft-magnetic hexagonal ferrite sintered ceramics | | |
|---|---|---|---|
| | Real part of permeability at 400 MHz | Imaginary part of permeability at 400 MHz | Resonance frequency (GHz) |
| Example 2 | 2.6 | 0.05 | 4.2 |
| Example 20 | 4.3 | 0.21 | 2.2 |
| Example 21 | 3.6 | 0.10 | 2.9 |
| Example 22 | 3.4 | 0.07 | 3.5 |
| Example 23 | 2.9 | 0.05 | 3.9 |
| Example 24 | 2.1 | 0.03 | 5.4 |
| Example 25 | 1.7 | 0.01 | 6.4 |
| Example 26 | 3.7 | 0.12 | 2.6 |
| Example 27 | 3.5 | 0.07 | 3.2 |
| Example 28 | 3.2 | 0.06 | 3.7 |
| Example 29 | 1.8 | 0.02 | 5.9 |
| Example 30 | 1.9 | 0.03 | 5.8 |
| Example 31 | 1.9 | 0.03 | 5.8 |
| Example 32 | 2.5 | 0.04 | 4.4 |
| Example 33 | 2.3 | 0.04 | 4.7 |
| Example 34 | 2.1 | 0.03 | 5.4 |
| Example 35 | 1.7 | 0.02 | 6.2 |
| Example 36 | 1.7 | 0.02 | 6.2 |

| Examples | Properties of soft-magnetic hexagonal ferrite sintered ceramics | |
|---|---|---|
| | Imaginary part of permeability at resonance frequency | Frequency at which reduction in real part of permeability is started (GHz) |
| Example 2 | 1.3 | 1.7 |
| Example 20 | 2.4 | 1.1 |
| Example 21 | 2.2 | 1.4 |
| Example 22 | 2.0 | 1.5 |
| Example 23 | 1.6 | 1.6 |

TABLE 13-continued

| Example 24 | 1.0 | 2.0 |
| Example 25 | 0.8 | 3.1 |
| Example 26 | 2.3 | 1.3 |
| Example 27 | 2.1 | 1.4 |
| Example 28 | 1.8 | 1.6 |
| Example 29 | 0.9 | 2.7 |
| Example 30 | 1.0 | 2.4 |
| Example 31 | 1.0 | 2.5 |
| Example 32 | 1.2 | 1.8 |
| Example 33 | 1.1 | 1.9 |
| Example 34 | 0.9 | 2.1 |
| Example 35 | 0.9 | 2.8 |
| Example 36 | 0.9 | 2.8 |

TABLE 14

| Comparative Examples | Molding Method | Pressure (t/m$^2$) |
|---|---|---|
| Comparative Example 8 | Green sheet method | $0.5 \times 10^4$ |
| Comparative Example 9 | Green sheet method | $0.5 \times 10^4$ |
| Comparative Example 10 | Green sheet method | $0.5 \times 10^4$ |
| Comparative Example 11 | Particle pressure-molding method | $0.5 \times 10^4$ |
| Comparative Example 12 | Particle pressure-molding method | $0.8 \times 10^4$ |
| Comparative Example 13 | Particle pressure-molding method | $0.8 \times 10^4$ |
| Comparative Example 14 | Green sheet method | $0.8 \times 10^4$ |
| Comparative Example 15 | Green sheet method | $1 \times 10^4$ |
| Comparative Example 17 | Green sheet method | $0.5 \times 10^4$ |

| | | | Properties of soft-magnetic hexagonal ferrite sintered ceramics | |
|---|---|---|---|---|
| | Sintering | | Sintering density (kg/m$^3$) | Volume resistivity (Ωm) |
| Comparative Examples | Temp. (° C.) | Time (hr) | | |
| Comparative Example 8 | 875 | 2 | $4.7 \times 10^3$ | $3 \times 10^6$ |
| Comparative Example 9 | 875 | 2 | $4.6 \times 10^3$ | $2 \times 10^6$ |
| Comparative Example 10 | 875 | 2 | $5.0 \times 10^3$ | $5 \times 10^5$ |
| Comparative Example 11 | 900 | 2 | $4.7 \times 10^3$ | $2 \times 10^6$ |
| Comparative Example 12 | 900 | 2 | $4.6 \times 10^3$ | $8 \times 10^5$ |
| Comparative Example 13 | 900 | 3 | $4.8 \times 10^3$ | $2 \times 10^6$ |
| Comparative Example 14 | 925 | 3 | $4.7 \times 10^3$ | $1 \times 10^6$ |
| Comparative Example 15 | 925 | 3 | $5.0 \times 10^3$ | $2 \times 10^5$ |
| Comparative Example 17 | 910 | 2 | $5.2 \times 10^3$ | $2 \times 10^5$ |

| | Properties of soft-magnetic hexagonal ferrite sintered ceramics | | |
|---|---|---|---|
| Comparative Examples | Real part of permeability at 400 MHz | Imaginary part of permeability at 400 MHz | Resonance frequency (GHz) |
| Comparative Example 8 | 1.4 | 0.01 | 6.9 |
| Comparative Example 9 | 1.3 | 0.01 | 7.2 |
| Comparative Example 10 | 4.5 | 0.22 | 1.8 |
| Comparative Example 11 | 1.2 | 0.01 | 7.8 |
| Comparative Example 12 | 1.2 | 0.01 | 7.9 |
| Comparative Example 13 | 1.4 | 0.01 | 6.8 |
| Comparative Example 14 | 1.3 | 0.01 | 7.1 |
| Comparative Example 15 | 2.3 | 0.04 | 4.8 |
| Comparative Example 17 | 3.7 | 0.21 | 1.6 |

| | Properties of soft-magnetic hexagonal ferrite sintered ceramics | |
|---|---|---|
| Comparative Examples | Imaginary part of permeability at resonance frequency | Frequency at which reduction in real part of permeability is started (GHz) |
| Comparative Example 8 | 0.7 | 3.4 |
| Comparative Example 9 | 0.6 | 3.6 |
| Comparative Example 10 | 2.6 | 1.0 |
| Comparative Example 11 | 0.5 | 3.8 |
| Comparative Example 12 | 0.5 | 3.9 |
| Comparative Example 13 | 0.7 | 3.4 |
| Comparative Example 14 | 0.6 | 3.5 |
| Comparative Example 15 | 1.1 | 1.9 |
| Comparative Example 17 | 1.6 | 0.69 |

What is claimed is:

1. Soft-magnetic hexagonal ferrite composite particles comprising:

(1) 100 parts by weight of (a) soft-magnetic hexagonal ferrite particles containing Z-type ferrite as a main phase comprising AO wherein A represents Ba, Sr or Ba—Sr, in an amount of 15 to 25 mol %, calculated as oxide, Me$^1$O wherein Me$^1$ represents Co and at least one element selected from the group consisting of Ni, Zn, Cu, Mg and Mn, in an amount of 5 to 15 mol %, calculated as oxide, with the proviso that the Co content is at least 30 mol % based on the total amount of Me$^1$, and Fe$_2$O$_3$ in an amount of 65 to 75 mol %, calculated as oxide;

(2) 0.3 to 10 parts by weight of barium carbonate particles, strontium carbonate particles or a mixture thereof; and (3) 0.1 to 5 parts by weight of silicon dioxide particles.

2. Soft-magnetic hexagonal ferrite composite particles according to claim 1, which have an average particle diameter of 0.1 to 30 μm, a BET specific surface area of 0.1 to 40 m$^2$/g, a saturation magnetization of 20 to 60 Am$^2$/kg and a coercive force of 0.50 to 50 kA/m.

3. Soft-magnetic hexagonal ferrite composite particles according to claim 1, wherein the amount of the barium carbonate particles, the strontium carbonate particles or the mixture thereof is 1 to 10 parts by weight based on 100 parts by weight of the soft-magnetic hexagonal ferrite particles, and the amount of the silicon dioxide particles is 0.5 to 5 parts by weight based on 100 parts by weight of the soft-magnetic hexagonal ferrite particles.

4. Soft-magnetic hexagonal ferrite composite particles according to claim 1, further comprising:
(4) 1 to 20 parts by weight of bismuth oxide particles based on 100 parts by weight of the soft-magnetic hexagonal ferrite particles and
(5) 0.3 to 7 parts by weight of copper oxide particles based on 100 parts by weight of the soft-magnetic hexagonal ferrite particles.

5. Soft-magnetic hexagonal ferrite composite particles according to claim 4, wherein the amount of the barium carbonate particles, the strontium carbonate particles or the mixture thereof is 0.3 to 7 parts by weight based on 100 parts by weight of the soft-magnetic hexagonal ferrite particles, and the amount of the silicon dioxide particles is 0.1 to 5 parts by weight based on 100 parts by weight of the soft-magnetic hexagonal ferrite particles.

6. Soft-magnetic hexagonal ferrite composite particles comprising:
(1) 100 parts by weight of (b) soft-magnetic hexagonal ferrite particles containing Y-type ferrite as a main phase comprising AO wherein A represents Ba, Sr or Ba—Sr, in an amount of 10 to 30 mol %, calculated as oxide, $Me^2O$ wherein $Me^2$ represents at least one element selected from the group consisting of Ni, Zn, Cu, Mg and Mn, in an amount of 10 to 30 mol %, calculated as oxide, and $Fe_2O_3$ in an amount of 55 to 65 mol %, calculated as oxide;
(2) 0.3 to 10 parts by weight of barium carbonate particles, strontium carbonate particles or a mixture thereof; and
(3) 0.1 to 5 parts by weight of silicon dioxide particles.

7. Soft-magnetic hexagonal ferrite composite particles according to claim 6, which have an average particle diameter of 0.1 to 30 tm, a BET specific surface area of 0.1 to 40 $m^2/g$, a saturation magnetization of 20 to 60 $Am^2/kg$ and a coercive force of 0.50 to 50 kA/m.

8. Soft-magnetic hexagonal ferrite composite particles according to claim 6, wherein the amount of the barium carbonate particles, the strontium carbonate particles or the mixture thereof is 1 to 10 parts by weight based on 100 parts by weight of the soft-magnetic hexagonal ferrite particles, and the amount of the silicon dioxide particles is 0.5 to 5 parts by weight based on 100 parts by weight of the soft-magnetic hexagonal ferrite particles.

9. Soft-magnetic hexagonal ferrite composite particles according to claim 6, further comprising:
(4) 1 to 20 parts by weight of bismuth oxide particles based on 100 parts by weight of the soft-magnetic hexagonal ferrite particles and
(5) 0.3 to 7 parts by weight of copper oxide particles based on 100 parts by weight of the soft-magnetic hexagonal ferrite particles.

10. Soft-magnetic hexagonal ferrite composite particles according to claim 9, wherein the amount of the barium carbonate particles, the strontium carbonate particles or the mixture thereof is 0.3 to 7 parts by weight based on 100 parts by weight of the soft-magnetic hexagonal ferrite particles, and the amount of the silicon dioxide particles is 0.1 to 5 parts by weight based on 100 parts by weight of the soft-magnetic hexagonal ferrite particles.

11. Soft-magnetic hexagonal ferrite composite particles comprising:
(1) 100 parts by weight of (c) soft-magnetic hexagonal ferrite particles containing W-type ferrite as a main phase comprising AO wherein A represents Ba, Sr or Ba—Sr, in an amount of 5 to 14 mol %, calculated as oxide, $Me^1O$ wherein $Me^1$ represents Co and at least one element selected from the group consisting of Ni, Zn, Cu, Mg and Mn, in an amount of 10 to 30 mol %, calculated as oxide, with the proviso that the Co content is at least 30 mol % based on the total amount of $Me^1$, and $Fe_2O_3$ in an amount of 65 to 80 mol %, calculated as oxide;
(2) 0.3 to 10 parts by weight of barium carbonate particles, strontium carbonate particles or a mixture thereof; and
(3) 0.1 to 5 parts by weight of silicon dioxide particles.

12. Soft-magnetic hexagonal ferrite composite particles according to claim 11, which have an average particle diameter of 0.1 to 30 μm, a BET specific surface area of 0.1 to 40 $m^2/g$, a saturation magnetization of 20 to 60 $Am^2/kg$ and a coercive force of 0.50 to 50 kA/m.

13. Soft-magnetic hexagonal ferrite composite particles according to claim 11, wherein the amount of the barium carbonate particles, the strontium carbonate particles or the mixture thereof is 1 to 10 parts by weight based on 100 parts by weight of the soft-magnetic hexagonal ferrite particles, and the amount of the silicon dioxide particles is 0.5 to 5 parts by weight based on 100 parts by weight of the soft-magnetic hexagonal ferrite particles.

14. Soft-magnetic hexagonal ferrite composite particles according to claim 11, further comprising:
(4) 1 to 20 parts by weight of bismuth oxide particles based on 100 parts by weight of the soft-magnetic hexagonal ferrite particles and
(5) 0.3 to 7 parts by weight of copper oxide particles based on 100 parts by weight of the soft-magnetic hexagonal ferrite particles.

15. Soft-magnetic hexagonal ferrite composite particles according to claim 14, wherein the amount of the barium carbonate particles, the strontium carbonate particles or the mixture thereof is 0.3 to 7 parts by weight based on 100 parts by weight of the soft-magnetic hexagonal ferrite particles, and the amount of the silicon dioxide particles is 0.1 to 5 parts by weight based on 100 parts by weight of the soft-magnetic hexagonal ferrite particles.

16. A green sheet comprising 100 parts by weight of the soft-magnetic hexagonal ferrite composite particles as defined in claim 1, and 2 to 20 parts by weight of a binder.

17. A green sheet comprising 100 parts by weight of the soft-magnetic hexagonal ferrite composite particles as defined in claim 4, and 2 to 20 parts by weight of a binder.

18. A green sheet comprising 100 parts by weight of the soft-magnetic hexagonal ferrite composite particles as defined in claim 6, and 2 to 20 parts by weight of a binder.

19. A green sheet comprising 100 parts by weight of the soft-magnetic hexagonal ferrite composite particles as defined in claim 9, and 2 to 20 parts by weight of a binder.

20. A green sheet comprising 100 parts by weight of the soft-magnetic hexagonal ferrite composite particles as defined in claim 11, and 2 to 20 parts by weight of a binder.

21. A green sheet comprising 100 parts by weight of the soft-magnetic hexagonal ferrite composite particles as defined in claims and 2 to 20 parts by weight of a binder.

22. A soft-magnetic hexagonal ferrite sintered ceramics having a sintering density of not less than $5.0 \times 10^3$ $kg/m^3$, a volume resistivity of not less than $1\times10^6$ Ωm and an imaginary part of permeability at 400 MHz of not more than 1, which is produced by forming the soft-magnetic hexagonal ferrite composite particles as defined in claim 1 into a compact and then sintering the compact.

23. A soft-magnetic hexagonal ferrite sintered ceramics having a sintering density of not less than $5.0\times10^3$ kg/m$^3$, a volume resistivity of not less than $1\times10^6$ Ωm and an imaginary part of permeability at 400 MHz of not more than 1, which is produced by forming the soft-magnetic hexagonal ferrite composite particles as defined in claim 4 into a compact and then sintering the compact.

24. A soft-magnetic hexagonal ferrite sintered ceramics according to claim 22 or claim 23, which has a sintering density of $5.0\times10^3$ to $5.3\times10^3$ kg/m$^3$, a volume resistivity of $1\times10^6$ to $5\times10^9$ Ωm and an imaginary part of permeability at 400 MHz of not more than 0.7.

25. A soft-magnetic hexagonal ferrite sintered ceramics having a sintering density of not less than $5.0\times10^3$ kg/m$^3$, a volume resistivity of not less than $1\times10^6$ Ωm and an imaginary part of permeability at 400 MHz of not more than 1, which is produced by laminating the green sheets as defined in claim 16 and then sintering the resultant laminate.

26. A soft-magnetic hexagonal ferrite sintered ceramics having a sintering density of not less than $5.0\times10^3$ kg/m$^3$, a volume resistivity of not less than $1\times10^6$ Ωm and an imaginary part of permeability at 400 MHz of not more than 1, which is produced by laminating the green sheets as defined in claim 17 and then sintering the resultant laminate.

27. A soft-magnetic hexagonal ferrite sintered ceramics having a sintering density of not less than $5.0\times10^3$ kg/m$^3$, a volume resistivity of not less than $1\times10^6$ Ωm and an imaginary part of permeability at 400 MHz of not more than 1, which is produced by forming the soft-magnetic hexagonal ferrite composite particles as defined in claim 6 into a compact and then sintering the compact.

28. A soft-magnetic hexagonal ferrite sintered ceramics having a sintering density of not less than $5.0\times10^3$ kg/m$^3$, a volume resistivity of not less than $1\times10^6$ Ωm and an imaginary part of permeability at 400 MHz of not more than 1, which is produced by forming the soft-magnetic hexagonal ferrite composite particles as defined in claim 9 into a compact and then sintering the compact.

29. A soft-magnetic hexagonal ferrite sintered ceramics according to claim 27 or claim 28, which has a sintering density of $5.0\times10^3$ to $5.3\times10^3$ kg/m$^3$, a volume resistivity of $1\times10^6$ to $5\times10^9$ Ωm and an imaginary part of permeability at 400 MHz of not more than 0.7.

30. A soft-magnetic hexagonal ferrite sintered ceramics having a sintering density of not less than $5.0\times10^3$ kg/m$^3$, a volume resistivity of not less than $1\times10^6$ Ωm and an imaginary part of permeability at 400 MHz of not more than 1, which is produced by laminating the green sheets as defined in claim 18 and then sintering the resultant laminate.

31. A soft-magnetic hexagonal ferrite sintered ceramics having a sintering density of not less than $5.0\times10^3$ kg/m$^3$, a volume resistivity of not less than $1\times10^6$ Ωm and an imaginary part of permeability at 400 MHz of not more than 1, which is produced by laminating the green sheets as defined in claim 19 and then sintering the resultant laminate.

32. A soft-magnetic hexagonal ferrite sintered ceramics having a sintering density of not less than $5.0\times10^3$ kg/m$^3$, a volume resistivity of not less than $1\times10^6$ Ωm and an imaginary part of permeability at 400 MHz of not more than 1, which is produced by forming the soft-magnetic hexagonal ferrite composite particles as defined in claim 11 into a compact and then sintering the compact.

33. A soft-magnetic hexagonal ferrite sintered ceramics having a sintering density of not less than $5.0\times10^3$ kg/m$^3$, a volume resistivity of not less than $1\times10^6$ Ωm and an imaginary part of permeability at 400 MHz of not more than 1, which is produced by forming the soft-magnetic hexagonal ferrite composite particles as defined in claim 14 into a compact and then sintering the compact.

34. A soft-magnetic hexagonal ferrite sintered ceramics according to claim 32 or claim 33, which has a sintering density of $5.0\times10^3$ to $5.3\times10^3$ kg/m$^3$, a volume resistivity of $1\times10^6$ to $5\times10^9$ Ωm and an imaginary part of permeability at 400 MHz of not more than 0.7.

35. A soft-magnetic hexagonal ferrite sintered ceramics having a sintering density of not less than $5.0\times10^3$ kg/m$^3$, a volume resistivity of not less than $1\times10^6$ Ωm and an imaginary part of permeability at 400 MHz of not more than 1, which is produced by laminating the green sheets as defined in claim 34 and then sintering the resultant laminate.

36. A soft-magnetic hexagonal ferrite sintered ceramics having a sintering density of not less than $5.0\times10^3$ kg/m$^3$, a volume resistivity of not less than $1\times10^6$ Ωm and an imaginary part of permeability at 400 MHz of not more than 1, which is produced by laminating the green sheets as defined in claim 21 and then sintering the resultant laminate.

* * * * *